(12) United States Patent
Khanh et al.

(10) Patent No.: US 12,156,287 B2
(45) Date of Patent: Nov. 26, 2024

(54) ELECTRONIC DEVICE FOR ADAPTIVELY PROVIDING SUBSCRIBER IDENTITY MODULE SETTING AND OPERATING METHOD THEREOF

(71) Applicant: Samsung Electronics Co., Ltd., Suwon-si (KR)

(72) Inventors: Nguyen Van Khanh, Yen Phong district (VN); Vu Duc Cuong, Yen Phong district (VN); Do Thi Thuy Van, Yen Phong district (VN); Nguyen Van Thinh, Yen Phong district (VN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/994,220

(22) Filed: Nov. 25, 2022

(65) Prior Publication Data

US 2023/0171583 A1 Jun. 1, 2023

Related U.S. Application Data

(63) Continuation of application No. PCT/KR2022/018363, filed on Nov. 18, 2022.

(30) Foreign Application Priority Data

Nov. 30, 2021 (KR) ........................ 10-2021-0168168

(51) Int. Cl.
 *H04W 8/18* (2009.01)
(52) U.S. Cl.
 CPC ..................... *H04W 8/18* (2013.01)

(58) Field of Classification Search
 CPC ...................................................... H04W 8/18
 (Continued)

(56) References Cited

U.S. PATENT DOCUMENTS

| 10,959,152 | B2 | 3/2021 | Chau et al. | |
| 2007/0184858 | A1* | 8/2007 | Landschaft | H04W 8/183 |
| | | | | 709/206 |

(Continued)

FOREIGN PATENT DOCUMENTS

| CN | 102065583 A | 5/2011 |
| EP | 1 223 768 B1 | 12/2003 |

(Continued)

OTHER PUBLICATIONS

International Search Report dated Feb. 23, 2023, issued in an International Application No. PCT /KR2022/018363.

(Continued)

*Primary Examiner* — Ahmad F. Matar
*Assistant Examiner* — Jirapon Tulop
(74) *Attorney, Agent, or Firm* — Jefferson IP Law, LLP

(57) ABSTRACT

An electronic device is provided. The electronic device includes a memory and at least one processor operatively connected to the memory, and the at least one processor is configured to, based on a subscriber identity module (SIM) change event, in which at least one SIM is inserted, occurring, identify whether SIM-related information related to the at least one SIM exists in a database which is stored in the memory and includes SIM setting information for services provided by the electronic device, and in case of being identified that the SIM-related information exists in the database, select a SIM for each of the services based on the SIM setting information.

20 Claims, 16 Drawing Sheets

(58) Field of Classification Search
USPC .......................................................... 455/418
See application file for complete search history.

(56) References Cited

U.S. PATENT DOCUMENTS

| | | |
|---|---|---|
| 2011/0081951 A1 | 4/2011 | Hwang |
| 2012/0122441 A1* | 5/2012 | Kim .................... H04W 28/18 |
| | | 455/418 |
| 2014/0169216 A1 | 6/2014 | Mansson et al. |
| 2015/0245309 A1 | 8/2015 | Nayak et al. |
| 2015/0296363 A1 | 10/2015 | Kaikkonen et al. |
| 2016/0029204 A1 | 1/2016 | Lalwaney |
| 2017/0230821 A1 | 8/2017 | Chong et al. |
| 2019/0069224 A1 | 2/2019 | Lee et al. |
| 2020/0052960 A1 | 2/2020 | Song et al. |
| 2020/0178147 A1* | 6/2020 | Chau .................... H04W 8/183 |
| 2021/0204111 A1 | 7/2021 | Jung et al. |

FOREIGN PATENT DOCUMENTS

| | | |
|---|---|---|
| JP | 2010-178240 A | 8/2010 |
| KR | 10-2011-0037487 A | 4/2011 |
| KR | 10-2011-0056164 A | 5/2011 |
| KR | 10-1663012 B1 | 10/2016 |
| KR | 10-2018-0131258 A | 12/2018 |
| KR | 10-2019-0021647 A | 3/2019 |
| KR | 10-2021-0086268 A | 7/2021 |
| WO | 2013/093559 A1 | 6/2013 |

OTHER PUBLICATIONS

GSM; Digital cellular telecommunications system; Subscriber Identity Modules (SIM); Functional characteristics (GSM 02.17 version 7.0.0 Release 1998) GSM 02.17; V7.0.0; XP050357501; Valbonne, France; Jul. 1, 1998.
Extended European Search Report dated Oct. 9, 2024; European Appln. 22901642.3-1215/4351189 PCT/KR2022018363.

* cited by examiner

1110

| SIM Group ID | Call | Sms | Data |
|---|---|---|---|
| none | none | none | none |

1120

| SIM Group ID | Call | Sms | Data |
|---|---|---|---|
| SIM145 | Iccid_1/ phone_no_1 | Iccid_4/ phone_no_4 | Iccid_5/ phone_no_5 |
| SIM25 | Iccid_2/ phone_no_2 | Iccid_2/ phone_no_2 | Iccid_5/ phone_no_5 |
| SIM123 | Iccid_1/ phone_no_1 | Iccid_2/ phone_no_2 | Iccid_3/ phone_no_3 |

FIG. 11

ELECTRONIC DEVICE FOR ADAPTIVELY PROVIDING SUBSCRIBER IDENTITY MODULE SETTING AND OPERATING METHOD THEREOF

CROSS-REFERENCE TO RELATED APPLICATION(S)

This application is a continuation application, claiming priority under § 365(c), of an International application No. PCT/KR2022/018363, filed on Nov. 18, 2022, which is based on and claims the benefit of a Korean patent application number 10-2021-0168168, filed on Nov. 30, 2021, in the Korean Intellectual Property Office, the disclosure of which is incorporated by reference herein in its entirety.

BACKGROUND

Technical Field

The disclosure relates to an electronic device for adaptively providing subscriber identity module (SIM) setting and an operating method thereof.

Description of Related Art

An electronic device (e.g., a user equipment (UE)) may access a wireless communication system and use a communication service (e.g., a voice communication service and/or a data communication service) at a determined location or on the move. To provide the electronic device with the communication service, an authenticating operation for the electronic device is required.

In general, a universal integrated circuit card (UICC) is inserted into the electronic device, and the authenticating operation may be performed between the electronic device and a server of a communication provider (e.g., a mobile network operator (MNO)) through a universal subscriber identity module (USIM) installed in the UICC. The UICC may be called a subscriber identity module (SIM) card in a case of a global system for mobile communications (GSM) scheme and a universal subscriber identity module (USIM) card in a case of wideband code division multiple access (WCDMA), long term evolution (LTE), and/or new radio (NR) schemes.

If a user of the electronic device subscribes to a wireless communication service provided by the communication provider, the communication provider may provide the user with a UICC (e.g., a SIM card or a USIM card), and the user may insert the UICC provided from the communication provider into the electronic device. If the UICC is inserted into the electronic device, a USIM application installed in the UICC may be executed, and an authenticating operation may be performed between the electronic device and the server of the communication provider using an encryption key value for authentication and an international mobile subscriber identity (IMSI) value stored in the UICC. If the authenticating operation is successful, the electronic device may receive the wireless communication service.

An electronic device may support two or more SIMs, an electronic device supporting two SIMs may be referred to as a "dual SIM electronic device", and an electronic device supporting a plurality of SIMs may be referred to as a "multi-SIM electronic device". The dual SIM electronic device or the multi-SIM electronic device may support the plurality of SIMs, and each of the plurality of SIMs may be associated with unique subscription information.

An electronic device in which one transceiver transmits and receives signals associated with two SIMs may be referred to as a "dual SIM dual standby (DSDS) electronic device". In the DSDS electronic device, if one of the two SIMs transmits and/or receives a signal, the other SIM may exist in a standby state. Alternatively, an electronic device capable of simultaneously operating two SIMs in an active state via a plurality of transceivers may be referred to as a dual SIM dual active (DSDA) electronic device.

The dual SIM electronic device is implemented to support two removable SIMs, or to support one removable SIM and an embedded subscriber identity module (eSIM). A removable SIM may be referred to as a "removable SIM (rSIM)". The rSIM may be referred to as a "physical SIM (pSIM)". An electronic device supporting two rSIMs may be implemented to include two slots capable of accommodating two rSIMs. An electronic device supporting one rSIM and an eSIM may include a slot capable of accommodating one SIM and the eSIM.

In an electronic device supporting a plurality of SIMs, if a new SIM is added other than at least one SIM being currently used, a user of the electronic device needs to manually select a SIM to be used (e.g., to be assigned) for each of services provided by the electronic device. Like this, if the user manually selects the SIM to be used for each of the services, a case in which the user selects a wrong SIM for a specific service may occur. Alternatively, if the user changes the eSIM to be used in another electronic device, not the electronic device in which the eSIM is currently used, SIM setting information (e.g., SIM assignment information for services) of the eSIM may not be restored in the other electronic device.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an electronic device for adaptively providing subscriber identity module (SIM) setting and an operating method thereof.

Additional aspects will be set forth in part in the description which follows and, in part, will be apparent from the description, or may be learned by practice of the presented embodiments.

In accordance with an aspect of the disclosure, an electronic device is provided. The electronic device includes a memory and at least one processor operatively connected to the memory.

According to an embodiment of the disclosure, the at least one processor may be configured to, based on a subscriber identity module (SIM) change event, in which at least one SIM is inserted, occurring, identify whether SIM-related information related to the at least one SIM exists in a database which is stored in the memory and includes SIM setting information for services provided by the electronic device.

According to an embodiment of the disclosure, the at least one processor may be further configured to, in case of being identified that the SIM-related information exists in the database, select a SIM for each of the services based on the SIM setting information.

In accordance with another aspect of the disclosure, an electronic device is provided. The electronic device includes a memory and at least one processor operatively connected to the memory.

According to an embodiment of the disclosure, the at least one processor may be configured to, based on a subscriber identity module (SIM) change event, in which at least one SIM is inserted, occurring, identify whether a number of SIMs inserted into the electronic device is two or more.

According to an embodiment of the disclosure, the at least one processor may be further configured to, in case of being identified that the number of the SIMs is two or more, identify whether the SIMs are included in a first SIM group.

According to an embodiment of the disclosure, the at least one processor may be further configured to, in case of being identified that the SIMs are included in the first SIM group, select a SIM for each of services provided by the electronic device, based on a database, which is stored in the memory and includes SIM setting information for the services provided by the electronic device, for each of a plurality of SIM groups including the first SIM group.

In accordance with another aspect of the disclosure, an electronic device is provided. The electronic device includes a memory and at least one processor operatively connected to the memory.

According to an embodiment of the disclosure, the at least one processor may be configured to, based on a subscriber identity module (SIM) change event, in which at least one SIM is inserted, occurring, identify whether an Internet connection is possible.

According to an embodiment of the disclosure, the at least one processor may be further configured to, in case of being identified that the Internet connection is possible, synchronize a first database which is stored in the memory and includes SIM setting information for services provided by the electronic device with a second database stored in an external electronic device.

According to an embodiment of the disclosure, the at least one processor may be further configured to, identify whether the SIM setting information exists in at least one active SIM among active SIMs inserted in the electronic device.

According to an embodiment of the disclosure, the at least one processor may be further configured to, in case of being identified that the SIM setting information exists in the at least one active SIM, identify whether the SIM setting information existing in the active SIM is latest SIM setting information.

According to an embodiment of the disclosure, the at least one processor may be further configured to, in case of being identified that the SIM setting information existing in the active SIM is the latest SIM setting information, synchronize the first database with the latest SIM setting information.

According to an embodiment of the disclosure, an operating method of an electronic device may comprise, based on a subscriber identity module (SIM) change event, in which at least one SIM is inserted, occurring, identifying whether SIM-related information related to the at least one SIM exists in a database which is stored in a memory and includes SIM setting information for services provided by the electronic device.

According to an embodiment of the disclosure, the operating method may further comprise, in case of being identified that the SIM-related information exists in the database, selecting a SIM for each of the services based on the SIM setting information.

According to an embodiment of the disclosure, an operating method of an electronic device may comprise, based on a subscriber identity module (SIM) change event, in which at least one SIM is inserted, occurring, identifying whether a number of SIMs inserted into the electronic device is two or more.

According to an embodiment of the disclosure, the operating method may further comprise, in case of being identified that the number of the SIMs is two or more, identifying whether the SIMs are included in a first SIM group.

According to an embodiment of the disclosure, the operating method may further comprise, in case of being identified that the SIMs are included in the first SIM group, selecting a SIM for each of services provided by the electronic device, based on a database, which is stored in the memory and includes SIM setting information for the services provided by the electronic device, for each of a plurality of SIM groups including the first SIM group.

According to an embodiment of the disclosure, an operating method of an electronic device may comprise, based on a subscriber identity module (SIM) change event, in which at least one SIM is inserted, occurring, identifying whether an Internet connection is possible.

According to an embodiment of the disclosure, the operating method may further comprise, in case of being identified that the Internet connection is possible, synchronizing a first database which is stored in a memory and includes SIM setting information for services provided by the electronic device with a second database stored in an external electronic device.

According to an embodiment of the disclosure, the operating method may further comprise identifying whether the SIM setting information exists in at least one active SIM among active SIMs inserted in the electronic device.

According to an embodiment of the disclosure, the operating method may further comprise, in case of being identified that the SIM setting information exists in the at least one active SIM, identifying whether the SIM setting information existing in the active SIM is latest SIM setting information.

According to an embodiment of the disclosure, the operating method may further comprise, in case of being identified that the SIM setting information existing in the active SIM is the latest SIM setting information, synchronizing the first database with the latest SIM setting information.

According to an embodiment of the disclosure, a non-transitory computer readable storage medium may include one or more programs, the one or more programs comprising instructions configured to, when executed by at least one processor of an electronic device, cause the electronic device to, based on a subscriber identity module (SIM) change event, in which at least one SIM is inserted, occurring, identify whether SIM-related information related to the at least one SIM exists in a database which is stored in a memory and includes SIM setting information for services provided by the electronic device.

According to an embodiment of the disclosure, the instructions may be further configured to cause the electronic device to, in case of being identified that the SIM-related information exists in the database, select a SIM for each of the services based on the SIM setting information.

According to an embodiment of the disclosure, a non-transitory computer readable storage medium may include one or more programs, the one or more programs comprising instructions configured to, when executed by at least one processor of an electronic device, cause the electronic device to, based on a subscriber identity module (SIM) change event, in which at least one SIM is inserted, occurring, identify whether a number of SIMs inserted into the electronic device is two or more.

According to an embodiment of the disclosure, the instructions may be further configured to cause the electronic device to, in case of being identified that the number of the SIMs is two or more, identify whether the SIMs are included in a first SIM group.

According to an embodiment of the disclosure, the instructions may be further configured to cause the electronic device to, in case of being identified that the SIMs are included in the first SIM group, select a SIM for each of services provided by the electronic device, based on a database, which is stored in the memory and includes SIM setting information for the services provided by the electronic device, for each of a plurality of SIM groups including the first SIM group.

According to an embodiment of the disclosure, a non-transitory computer readable storage medium may include one or more programs, the one or more programs comprising instructions configured to, when executed by at least one processor of an electronic device, cause the electronic device to, based on a subscriber identity module (SIM) change event, in which at least one SIM is inserted, occurring, identify whether an Internet connection is possible.

According to an embodiment of the disclosure, the instructions may be further configured to cause the electronic device to, in case of being identified that the Internet connection is possible, synchronize a first database which is stored in a memory and includes SIM setting information for services provided by the electronic device with a second database stored in an external electronic device.

According to an embodiment of the disclosure, the instructions may be further configured to cause the electronic device to identify whether the SIM setting information exists in at least one active SIM among active SIMs inserted in the electronic device.

According to an embodiment of the disclosure, the instructions may be further configured to cause the electronic device to, in case of being identified that the SIM setting information exists in the at least one active SIM, identify whether the SIM setting information existing in the active SIM is latest SIM setting information.

According to an embodiment of the disclosure, the instructions may be further configured to cause the electronic device to, in case of being identified that the SIM setting information existing in the active SIM is the latest SIM setting information, synchronizing the first database with the latest SIM setting information.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 11 is a diagram illustrating an operation in which an electronic device initializes or updates a SIM group setting database according to an embodiment of the disclosure;

Throughout the drawings, it should be noted that like reference numbers are used to depict the same or similar elements, features, and structures.

DETAILED DESCRIPTION

Figure 1:
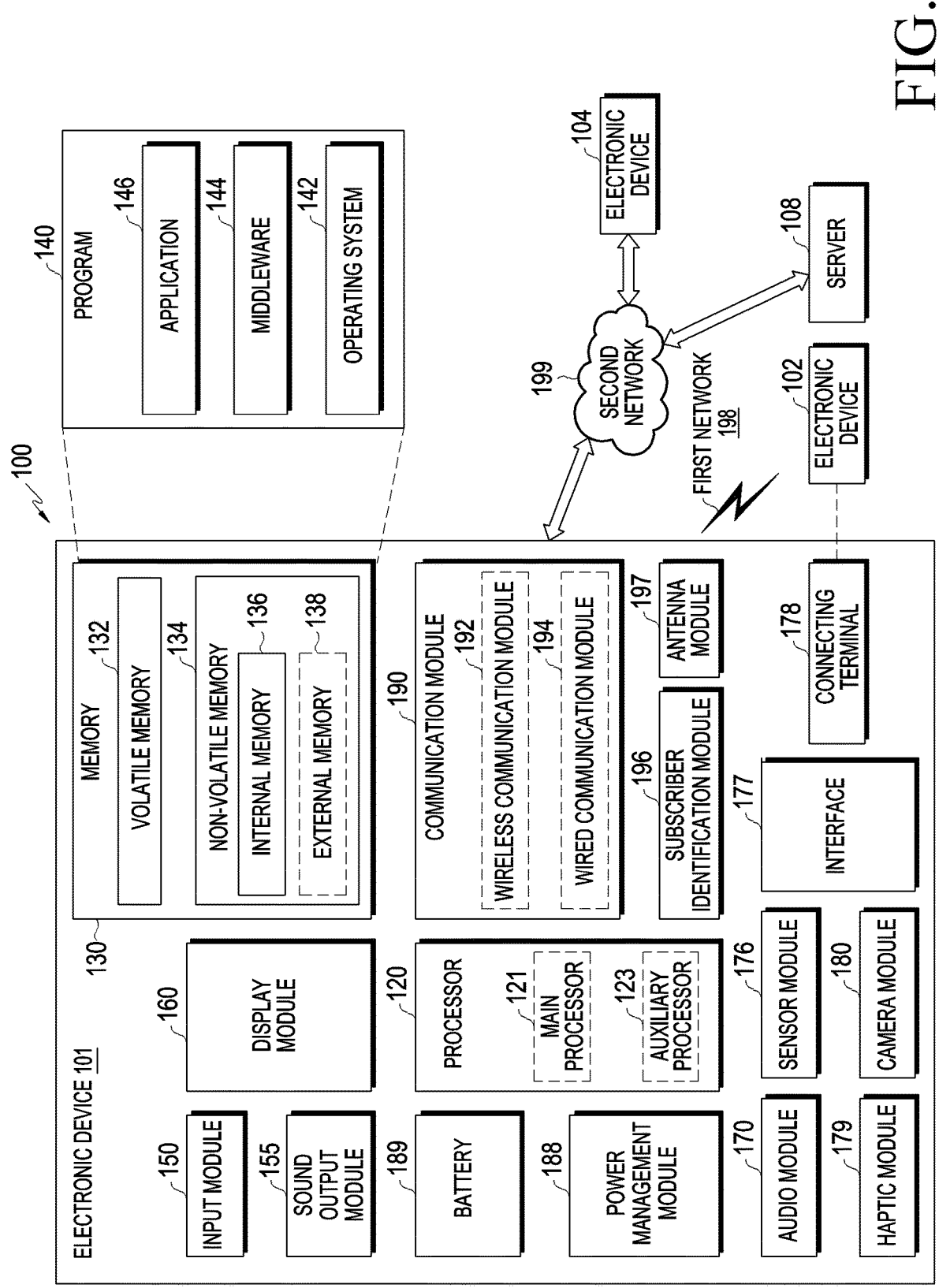
FIG. 1 is a block diagram schematically illustrating an electronic device within a network environment according to an embodiment of the disclosure.

Hereinafter, an embodiment of the disclosure will be described in detail with reference to the accompanying drawings. In the following description of an embodiment of the disclosure, a detailed description of relevant known functions or configurations incorporated herein will be omitted when it is determined that the description may make the subject matter of an embodiment of the disclosure unnecessarily unclear. The terms which will be described below are terms defined in consideration of the functions in the disclosure, and may be different according to users, intentions of the users, or customs. Therefore, the definitions of the terms should be made based on the contents throughout the specification.

It should be noted that the technical terms used herein are only used to describe a specific embodiment, and are not intended to limit the disclosure. Alternatively, the technical terms used herein should be interpreted to have the same meaning as those commonly understood by a person skilled in the art to which the disclosure pertains, and should not be interpreted have excessively comprehensive or excessively restricted meanings unless particularly defined as other meanings. Alternatively, when the technical terms used herein are wrong technical terms that cannot correctly represent the idea of the disclosure, it should be appreciated that they are replaced by technical terms correctly understood by those skilled in the art. Alternatively, the general terms used herein should be interpreted as defined in dictionaries or interpreted in the context of the relevant part, and should not be interpreted to have excessively restricted meanings.

Alternatively, a singular expression used herein may include a plural expression unless they are definitely different in the context. As used herein, such an expression as "comprises" or "include", or the like should not be interpreted to necessarily include all elements or all operations described in the specification, and should be interpreted to be allowed to exclude some of them or further include additional elements or operations.

Alternatively, the terms including an ordinal number, such as expressions "a first" and "a second" may be used to describe various elements, but the corresponding elements should not be limited by such terms. These terms are used merely to distinguish between one element and any other element. For example, a first element may be termed a second element, and similarly, a second element may be termed a first element without departing from the scope of the disclosure.

It should be understood that when an element is referred to as being "connected" or "coupled" to another element, it may be connected or coupled directly to the other element, or any other element may be interposer between them. In contrast, it should be understood that when an element is referred to as being "directly connected" or "directly coupled" to another element, there are no element interposed between them.

Hereinafter, an embodiment of the disclosure will be described with reference to the accompanying drawings. Regardless of drawing signs, the same or like elements are provided with the same reference numeral, and a repeated description thereof will be omitted. Alternatively, in describing an embodiment of the disclosure, a detailed description of relevant known technologies will be omitted when it is determined that the description may make the subject matter of the disclosure unclear. Alternatively, it should be noted that the accompanying drawings are presented merely to help easy understanding of the technical idea of the disclosure, and should not be construed to limit the technical idea of the disclosure. The technical idea of the disclosure should be construed to cover all changes, equivalents, and alternatives, in addition to the drawings.

Hereinafter, a terminal will be described in an embodiment of the disclosure, but the terminal may be referred to as an electronic device, a mobile station, a mobile equipment (ME), a user equipment (UE), a user terminal (UT), a subscriber station (SS), a wireless device, a handheld device, and an access terminal (AT). Alternatively, in an embodiment of the disclosure, the terminal may be a device having a communication function, such as, for example, a mobile phone, a personal digital assistant (PDA), a smart phone, a wireless MODEM, and a notebook.

In a detailed description of an embodiment of the disclosure, a standard specified by Bluetooth special interest group (SIG) is referred to, but the main subject of the disclosure can be somewhat modified and applied to other communication systems having a similar technical background without departing from the scope of the disclosure, and the modifications can be made based on determination of those skilled in the art.

FIG. 1 is a block diagram illustrating an electronic device in a network environment according to an embodiment of the disclosure.

Referring to FIG. 1, an electronic device 101 in a network environment 100 may communicate with an electronic device 102 via a first network 198 (e.g., a short-range wireless communication network), or an electronic device 104 or a server 108 via a second network 199 (e.g., a long-range wireless communication network). According to an embodiment of the disclosure, the electronic device 101 may communicate with the electronic device 104 via the server 108. According to an embodiment of the disclosure, the electronic device 101 may include a processor 120, a memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In an embodiment of the disclosure, at least one of the components (e.g., the connecting terminal 178) may be omitted from the electronic device 101, or one or more other components may be added in the electronic device 101. In an embodiment of the disclosure, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment of the disclosure, as at least part of the data processing or computation, the processor 120 may store a command or data received from another component (e.g., the sensor module 176 or the communication module 190) in a volatile memory 132, process the command or the data stored in the volatile memory 132, and store resulting data in a non-volatile memory 134. According to an embodiment of the disclosure, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control, for example, at least some of functions or states related to at least one component (e.g., the display module 160, the sensor module 176, or the communication module 190) among the components of the electronic device 101, instead of the main processor 121 while the main processor 121 is in an inactive (e.g., a sleep) state, or together with the main processor 121 while the main processor 121 is in an active (e.g., executing an application) state. According to an embodiment of the disclosure, the auxiliary processor 123 (e.g., an image signal processor or a communication processor) may be implemented as part of another component (e.g., the camera module 180 or the communication module 190) functionally related to the auxiliary processor 123. According to an embodiment of the disclosure, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence model is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment of the disclosure, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment of the disclosure, the display module 160 may include a touch sensor adapted to detect a touch, or a pressure sensor adapted to measure the intensity of force incurred by the touch.

The audio module 170 may convert a sound into an electrical signal and vice versa. According to an embodiment of the disclosure, the audio module 170 may obtain the sound via the input module 150, or output the sound via the sound output module 155 or an external electronic device (e.g., the electronic device 102 (e.g., a speaker or a headphone)) directly or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment of the disclosure, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly or wirelessly. According to an embodiment of the disclosure, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment of the disclosure, the connecting terminal 178 may include, for example, a HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment of the disclosure, the haptic module 179 may include, for example, a motor, a piezoelectric element, or an electric stimulator.

The camera module 180 may capture a still image or moving images. According to an embodiment of the disclosure, the camera module 180 may include one or more lenses, image sensors, image signal processors, or flashes.

The power management module 188 may manage power supplied to the electronic device 101. According to one embodiment of the disclosure, the power management module 188 may be implemented as at least part of, for example, a power management integrated circuit (PMIC).

The battery 189 may supply power to at least one component of the electronic device 101. According to an embodiment of the disclosure, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment of the disclosure, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment of the disclosure, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment of the disclosure, the antenna module 197 may include an antenna including a radiating element including a conductive material or a conductive pattern formed in or on a substrate (e.g., a printed circuit board (PCB)). According to an embodiment of the disclosure, the antenna module 197 may include a plurality of antennas (e.g., array antennas). In such a case, at least one antenna appropriate for a communication scheme used in the communication network, such as the first network 198 or the second network 199, may be selected, for example, by the communication module 190 from the plurality of antennas. The signal or the power may then be transmitted or received between the communication module 190 and the external electronic device via the selected at least one antenna. According to an embodiment of the disclosure, another component (e.g., a radio frequency integrated circuit (RFIC)) other than the radiating element may be additionally formed as part of the antenna module 197.

According to an embodiment of the disclosure, the antenna module 197 may form a mmWave antenna module. According to an embodiment of the disclosure, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment of the disclosure, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment of the disclosure, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment of the disclosure, the external electronic device 104 may include an internet-of-things (IoT) device. The server 108 may be an intelligent server using machine learning and/or a neural network. According to an embodiment of the disclosure, the external electronic device 104 or the server 108 may be included in the second network 199. The electronic device 101 may be applied to intelligent services (e.g., a smart home, a smart city, a smart car, or healthcare) based on 5G communication technology or IoT-related technology.

The electronic device according to an embodiment may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that an embodiment of the disclosure and the terms used therein are not intended to limit the technological features set forth herein to a particular embodiment and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1$^{st}$" so and "2$^{nd}$," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with an embodiment of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or two or more functions. For example, according to an embodiment of the disclosure, the module may be implemented in a form of an application-specific integrated circuit (ASIC).

An embodiment as set forth herein may be implemented as software (e.g., the program 140) including one or more instructions that are stored in a storage medium (e.g., an internal memory 136 or an external memory 138) that is readable by a machine (e.g., the electronic device 101). For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment of the disclosure, a method according to an embodiment of the disclosure may be included and provided in a computer program product. The computer program product may be traded as a product between a seller and a buyer. The computer program product may be distributed in the form of a machine-readable storage medium (e.g., a compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to an embodiment of the disclosure, each component (e.g., a module or a program) of the above-described components may include a single entity or multiple entities, and some of the multiple entities may be separately disposed in different components. According to an embodiment of the disclosure, one or more of the above-described components or operations may be omitted, or one or more other components or operations may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to an embodiment of the disclosure, operations performed by the module, the program, or another component may be carried out sequentially, in parallel, repeatedly, or heuristically, or one or more of the operations may be executed in a different order or omitted, or one or more other operations may be added.

Hereinafter, a method of installing and managing a subscriber identity module (SIM) in an electronic device will be described with reference to FIGS. 2, 3, and 4. In an embodiment of the disclosure, the SIM may be a removable SIM (rSIM) or an embedded subscriber identity module (eSIM). The rSIM may be referred to as a "physical SIM (pSIM)".

Figure 2:
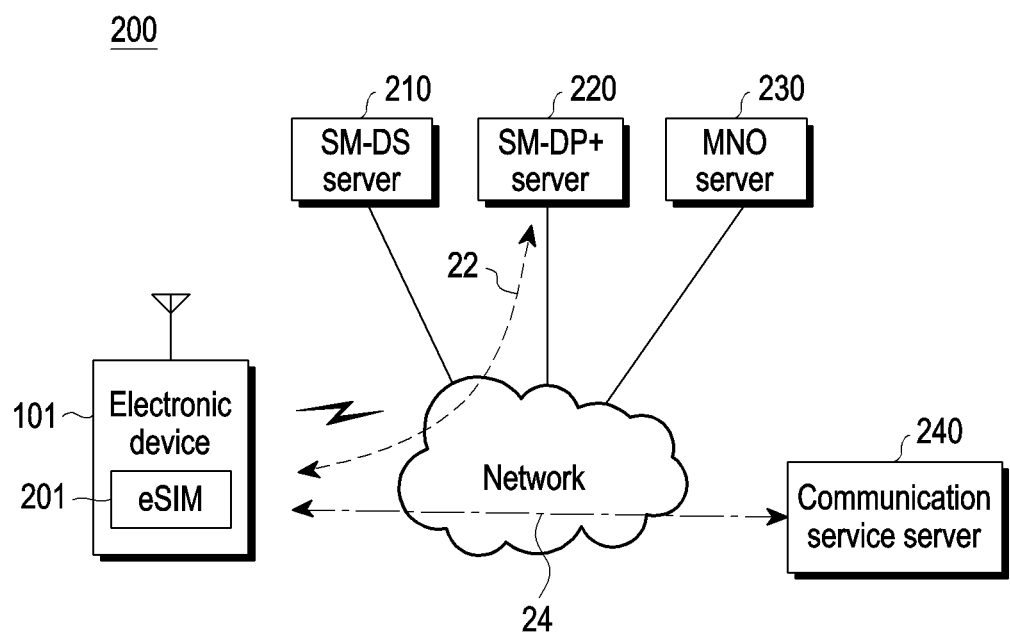
FIG. 2 is a diagram schematically illustrating a wireless communication system for providing a profile-based communication connection to an electronic device according to an embodiment of the disclosure.

FIG. 2 is a diagram schematically illustrating a wireless communication system for providing a profile-based communication connection to an electronic device according to an embodiment of the disclosure.

Referring to FIG. 2, according to an embodiment of the disclosure, a wireless communication system 200 may include an electronic device 101 (e.g., an electronic device 101 in FIG. 1), a subscription manager discovery service (SM-DS) server 210, a subscription manager data preparation plus (SM-DP+) server 220, a mobile network operator (MNO) server 230, and/or a communication service server 240.

In an embodiment of the disclosure, an MNO may be a communication provider. According to an embodiment of the disclosure, the electronic device 101 may include an eSIM 201. For convenience of description, although not illustrated, the electronic device 101 may include at least two slots capable of accommodating at least two rSIMs. Alternatively, the electronic device 101 may be implemented to include at least two eSIMs and one slot capable of accommodating one rSIM. According to an embodiment of the disclosure, the electronic device 101 may include or accommodate N (N is an integer greater than or equal to 1) SIMs (eSIMs or rSIMs) and may perform a switching operation to use some of the N SIMs. There is no limitation to combining the N SIMs, and there is also no limitation to a value of N.

According to an embodiment of the disclosure, the eSIM 201 may be inserted into the electronic device 101, provided integrally with the electronic device 101, or implemented to be accessible by the electronic device 101. According to an embodiment of the disclosure, the eSIM 201 may allow the electronic device 101 to perform an authenticating operation with a server of a communication provider (e.g., the MNO) using information (e.g., a profile including universal subscriber identity module (USIM) information) within the eSIM 201. According to an embodiment of the disclosure, the eSIM 201 may be called a subscriber identity module (SIM) card for a global system for mobile communications (GSM) scheme or called a universal subscriber identity module (USIM) card for wideband code division multiple access (WCDMA), long-term evolution (LTE), and/or new radio (NR) schemes. For example, if a user of the electronic device 101 subscribes to a wireless communication service provided by the communication provider, the electronic device 101 may perform an authenticating operation with the server of the communication provider using information (e.g., an international mobile subscriber identity (IMSI) value) within the eSIM 201 and an encryption key (e.g., a K value) for authentication.

If the authenticating operation for the electronic device 101 is successful, the electronic device 101 may enable the wireless communication service to be used. For example, the authenticating operation may be an authenticating operation which is based on an authentication and key agreement (AKA) protocol. In an embodiment of the disclosure, the authenticating operation may be based on other authentication schemes as well as the AKA protocol.

According to an embodiment of the disclosure, the eSIM 201 may be manufactured in a form of a dedicated card for a specific communication provider according to a request of the specific communication provider. The eSIM 201 may be preloaded with authentication information (e.g., a USIM application and a subscriber ID (e.g., an IMSI)) and/or an encryption key (e.g., a known K value or Ki value) for a network access of the corresponding provider. An application (or information) within the eSIM 201 may be installed, modified, deleted, or updated based on a scheme, such as an over the air (OTA) scheme when necessary.

According to an embodiment of the disclosure, the eSIM 201 may download and/or store information for providing a communication service, in the form of a profile. According to an embodiment of the disclosure, the profile may be installed or stored in a manufacturing process of the eSIM 201 or may be downloaded by the electronic device 101 based on the OTA scheme and installed or stored in the eSIM 201.

In an embodiment of the disclosure, the profile may include a provisioning profile and an operational profile. Even though the provisioning profile is not installed, the electronic device 101 may download the operational profile through a short-range connection which is based on a Wi-Fi scheme or an Internet connection. According to an embodiment of the disclosure, the provisioning profile does not necessarily need to be installed on the electronic device 101. For example, the operational profile may be a profile including subscriber identification information about the user of the electronic device 101, and the provisioning profile may include information (hereinafter, it may also be referred to as "first information") for downloading subscriber identity information or a profile (hereinafter, it may also be referred to as a "first operational profile") including subscriber identity information (hereinafter, it may also be referred to as "first subscriber identity information") in the electronic device 101.

The electronic device 101 may download the first operational profile based on the first information included in the provisioning profile within the eSIM 201.

According to an embodiment of the disclosure, the electronic device 101 may receive a communication service using subscriber identity information (hereinafter, it may also be referred to as "second subscriber identity information") included in an operational profile (hereinafter, it may also be referred to as a "second operational profile") installed or stored in the eSIM 201. For example, the profile including subscriber identification information may be a SIM profile.

According to an embodiment of the disclosure, the operational profile may further include, in addition to the subscriber identification information, various information related to the subscriber (e.g., network access authentication information, a phone book, personal information (e.g., a short message service (SMS)), a subscribed communication carrier name, available services, available data amount, fee, a service provision speed, or information to allow for safe use of a wireless communication service by performing subscriber authentication and traffic security key generation upon accessing a wireless communication network (e.g., GSM, WCDMA, LTE, and/or NR wireless communication networks).

According to an embodiment of the disclosure, the first information for downloading data (e.g., the first operational profile) including the first subscriber identity information may include communication session information for a first communication connection designated for downloading the first operational profile. For example, the communication session information may include access information for the SM-DS server 210 for downloading the first operational profile or communication provider network information usable for an access to the SM-DS server 210.

According to an embodiment of the disclosure, the SM-DS server 210 may provide the electronic device 101 with an address of the SM-DP+ server 220 for downloading the first operational profile based on the provisioning profile.

According to an embodiment of the disclosure, the SM-DP+ server 220 may be a profile providing server, an off-card entity of profile domain, a profile encryption server, a profile generating server, a profile provisioner, or a profile provider. The SM-DP+ server 220 may perform an operation for establishing a first communication connection 22 with the electronic device 101 through a wireless communication network based on a first communication connection request based on the provisioning profile from the electronic device 101, and may provide the electronic device 101 with the first operational profile through the first communication connection 22.

According to an embodiment of the disclosure, the wireless communication network may be a designated node of the wireless communication network. For example, the wireless communication network may be a base station, a subscriber information management node, or a mobility management node of the wireless communication network. According to an embodiment of the disclosure, the wireless communication network may include a home position register (HLR) and/or authentication center (AuC) server which is accessed by the electronic device 101 to perform a subscriber authenticating function. According to an embodiment of the disclosure, after succeeding in authentication, the electronic device 101 may connect to the communication service server 240 capable of providing various communication services, such as a voice communication or data communication.

According to an embodiment of the disclosure, the MNO server 230 may be a server associated with a mobile communication network operator. According to an embodiment of the disclosure, the MNO server 230 may request the SM-DS+ server 220 to prepare for at least one profile (or profile package) (e.g., the first operational profile) associated with at least one subscriber identity information (e.g., the first subscriber identity information). In an embodiment of the disclosure, the MNO server 230 may transmit information associated with the first operational profile to the SM-DS+ server 220. According to an embodiment of the disclosure, the MNO server 230 may transmit a signal for updating and managing the first operational profile to the SM-DS+ server 220. The MNO server 230 may allow a second communication connection 24 between the electronic device 101 and the communication service server 240 through the second operational profile installed in the eSIM 201 of the electronic device 101.

According to an embodiment of the disclosure, the communication service server 240 may be a server providing communication services. According to an embodiment of the disclosure, the communication service may be a service associated with transmission or reception of data through a wireless communication network. According to an embodiment of the disclosure, the communication service may include a service associated with transmission or reception of another profile (or data) not including subscriber identity information other than downloading the operational profile (e.g., the first operational profile including the first subscriber identity information). For example, the communication service server 240 may include various service servers associated with data transmission and reception, such as a server associated with each of various applications, a push server, a search server, or a market server. In an embodiment of the disclosure, a communication service by the communication service server 240 may include various services, such as data transmission/reception by an application, notification reception, push reception, link reception and access, or service request.

Figure 3:
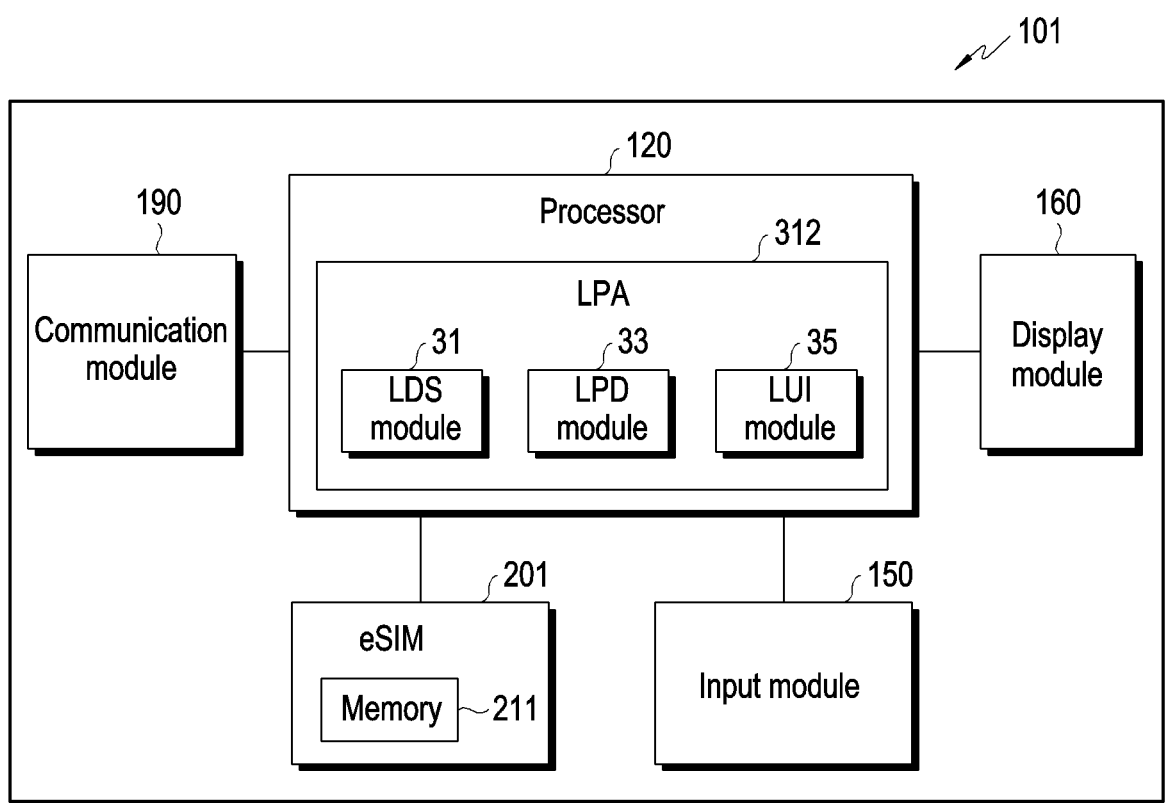
FIG. 3 is a block diagram schematically illustrating an internal structure of an electronic device according to an embodiment of the disclosure.

FIG. 3 is a block diagram schematically illustrating an internal structure of an electronic device according to an embodiment of the disclosure.

Referring to FIG. 3, according to an embodiment of the disclosure, an electronic device 101 (e.g., an electronic device 101 in FIG. 1 or FIG. 2) may include a processor 120, an eSIM 201 (e.g., a subscriber identification module 196 in FIG. 1 or an eSIM 201 in FIG. 2), a communication module 190 (e.g., the communication module 190 in FIG. 1), a display module 160 (the display module 160 in FIG. 1), and/or an input module 150. For convenience of description, although not illustrated in FIG. 3, the electronic device 101 may include at least two slots capable of accommodating at least two rSIMs.

According to an embodiment of the disclosure, the processor 120 (e.g., a processor 120 in FIG. 1) may include one or more processors (e.g., the main processor 121 and an auxiliary processor 123 in FIG. 1, or an application processor and a communication processor). According to an embodiment of the disclosure, the processor 120 may include a local profile assistant (LPA) 312 (e.g., an LPA device (LPAd)). According to an embodiment of the disclosure, if the processor 120 includes a plurality of processors, some of the plurality of processors may include a portion of the LPA 312, and others of the plurality of processors may include another portion of the LPA 312. According to an embodiment of the disclosure, the LPA 312 may be included in the eSIM 201 and, in this case, the LPA 312 may be referred to as an embedded LPA (LPAe) (or eUICC).

According to an embodiment of the disclosure, the LPA 312 may perform a communication with a server to support an operation of downloading, installing, and/or managing a profile of the eSIM 201, or may perform an operation of providing a user interface (UI) required for an operation of downloading, installing, and managing a profile. The LPA 312 may include a local discovery services (LDS) module 31, a local profile download (LPD) module 33, and/or a local user interface (LUI) module 35 within the electronic device 101.

According to an embodiment of the disclosure, the LDS module 31 may perform an operation of receiving an address of an SM-DS+ server 220 capable of downloading an operational profile based on a provisioning profile provided from an SM-DS server 210 and communication with the SM-DS server 210.

According to an embodiment of the disclosure, the LPD module 33 may perform an operation of establishing a first communication connection 22 with the SM-DS+ server 220 through a wireless communication network based on the address of the SM-DS+ server 220 and perform an operation of receiving a first operational profile from the SM-DS+ server 220 through the first communication connection 22. According to an embodiment of the disclosure, the LPD 33 module may support an operation of downloading, enabling, disabling, and/or deleting a profile, or a profile policy rule (PPR) download operation, started by a network, and/or may support an operation of enabling, disabling, and deleting a profile, or an eUICC reset operation by the electronic device 101.

According to an embodiment of the disclosure, the LUI module 35 may perform an operation of providing various UIs upon downloading the operational profile. According to an embodiment of the disclosure, the LUI module 35 may support a data exchanging operation between the LDS module 31 and the LPD module 33 and may include a UI for transferring a user's input to the LDS module 31 or the LPD module 33.

According to an embodiment of the disclosure, the processor 120 may perform a communication service based on information stored in the eSIM 201 using (or by executing) the LPA 312. For example, the processor 120 may establish a first communication connection 22 to download a profile (e.g., the first operational profile) including first subscriber identity information, with the SM-DS+ server 220 through the communication module 190 based on the provisioning profile stored in the eSIM 201, using the LPA 312. Upon request of transmission or reception of data or a profile not including subscriber identity information during the first communication connection 22 using the LPA 312, the processor 120 may release the first communication connection 22 and establish a second communication connection 24 based on second subscriber identity information to perform transmission or reception of the data or profile not including the subscriber identity information.

According to an embodiment of the disclosure, the eSIM 201 may include at least one profile, as information for receiving a communication service. A profile may mean a packaging, in a form of software, of at least one of an application, a file system, or an authentication key value stored in the eSIM 201. For example, the profile may include a provisioning profile and an operational profile. The operational profile may include subscriber identification information. The operational profile may further include, in addition to the subscriber identification information, various information related to the subscriber (e.g., network access authentication information, a phone book, personal information (e.g., an SMS), a subscribed communication carrier name, available services, available data amount, fee, a service provision speed, or information to allow for safe use of a wireless communication service by performing subscriber authentication and traffic security key generation upon accessing a wireless communication network (e.g., GSM, WCDMA, LTE, and/or NR wireless communication networks). According to an embodiment of the disclosure, the operational profile may include a SIM profile. For example, the SIM profile may include SIM file systems (e.g., a master file (MF), a dedicated file (DF), and/or an elementary file (EF)), and an IMSI value of the electronic device 101 may be stored in an EF.

According to an embodiment of the disclosure, the provisioning profile may be a profile including first information for downloading the first operational profile in the electronic device 101. For example, the first information may include communication session information for the first communication connection 22 designated for downloading the first operational profile. For example, the communication session information may include access information for an SM-DS server (e.g., an SM-DS server 210 in FIG. 2) for downloading the first operational profile, and may include communication provider network information usable for an access to the SM-DS server.

According to an embodiment of the disclosure, the communication module 190 may perform a first communication based on the provisioning profile or a second communication based on the second operational profile. At least one screen associated with the first communication based on the provisioning profile or the second communication based on the second operational profile may be displayed on the display device 160.

According to an embodiment of the disclosure, although a case that the LPA 312 is included in the processor 120 has been described, at least some functions of the LPA 312 may be performed by the processor 120, or a separate LPA 312 may be operated in conjunction with the processor 120. For example, the LPA 312 may be included in a program (e.g., the program 140 in FIG. 1) and may be loaded onto the processor 120 and executed, and if the LPA 312 is loaded on the processor 120 and executed, it may be understood as an operation of the processor 120. According to an embodiment of the disclosure, function modules (e.g., the LDS module 31, the LPD module 33, or the LUI module 35) included in the LPA 312 may be implemented with other function modules, and an embodiment of the disclosure may not be limited thereto. According to an embodiment of the disclosure, the LPA 312 may be included in the eSIM 201.

Figure 4:
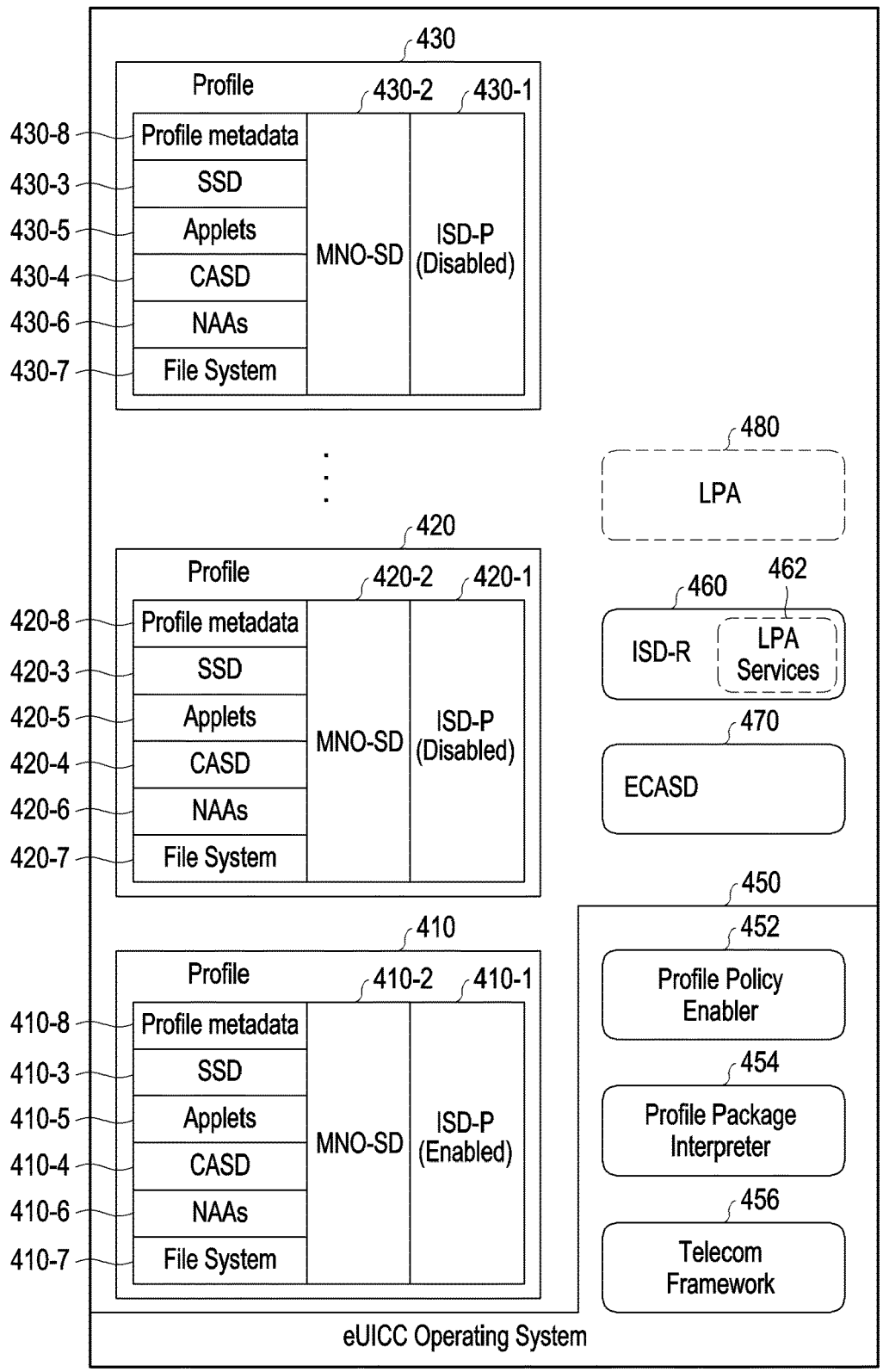
FIG. 4 is a diagram illustrating an internal structure of an embedded universal integrated circuit card (eUICC) according to an embodiment of the disclosure.

FIG. 4 is a diagram illustrating an internal structure of an embedded universal integrated circuit card (eUICC) according to an embodiment of the disclosure.

Referring to FIG. 4, an eUICC 401 (e.g., an eSIM 201 in FIG. 2 or 3) may be implemented in a form, such as a card or chip, and at least one profile 410, 420, or 430 may be installed in the eUICC 401.

According to an embodiment of the disclosure, each of the at least one profile 410, 420, or 430 may be a provisioning profile or an operational profile. The at least one profile 410, 420, or 430 may operate on an eUICC operating system (OS) 450. Each of the at least one profile 410, 420, or 430 may be enabled or disabled by a processor (e.g., the processor 120 in FIG. 1 or 3) or an LPA 480 (e.g., an LPA 312 in FIG. 3). In FIG. 4, a profile 410 may be in an enabled state, and the remaining profiles 420 and 430 may be in a disabled state.

According to an embodiment of the disclosure, the eUICC OS 450 of the eUICC 401 may include a profile policy enabler 452, a profile package interpreter 454, and/or a telecom framework 456.

According to an embodiment of the disclosure, the profile policy enabler 452 may manage a PPR for each of the at least one profile 410, 420, or 430. According to an embodiment of the disclosure, the profile package interpreter 454 may unpackage a profile package received from an SM-DP+(e.g., an SM-DP+ 220 in FIG. 2), in a form which may be installed in the eUICC 401.

According to an embodiment of the disclosure, the telecom framework 456 may perform a function associated with a communication of applications within the eUICC 401.

According to an embodiment of the disclosure, the eUICC 401 may include an issuer security domain root (ISD-R) 460, or an eUICC controlling authority security domain (ECASD) 470.

According to an embodiment of the disclosure, the ISD-R 460 may manage the at least one profile 410, 420, or 430 installed in the eUICC 401. For example, the ISD-R 460 may include LPA services 462, and the LPA services 462 may manage the at least one profile 410, 420, or 430 installed in the eUICC 401 through an interface with the processor 120 or the LPA 480. According to an embodiment of the disclosure, the ECASD 470 may perform a security processing operation on the at least one profile 410, 420, or 430 installed in the eUICC 401.

According to an embodiment of the disclosure, each of the at least one profile 410, 420, or 430 may include an ISD-P 410-1, 420-1 or 430-1, an MNO-SD 410-2, 420-2, or 430-2, a supplementary security domain (SSD) 410-3, 420-3, or 430-3, a controlling authority security domain (CASD) 410-4, 420-4, or 430-4, applets 410-5, 420-5, or 430-5, network access applications (NAAs) 410-6, 420-6 or 430-6, a file system 410-7, 420-7, or 430-7, or profile metadata 410-8, 420-8, or 430-8.

According to an embodiment of the disclosure, the ISD-P 410-1, 420-1, or 430-1 may include information for decoding and interpretation of the profile package, and may be used to unpackage and install the profile package received from the SM-DP+.

According to an embodiment of the disclosure, the MNO-SD 410-2, 420-2, or 430-2 may include an OTA key of an MNO server (e.g., an MNO server 230 in FIG. 2), and may include information for providing a secure OTA channel capable of communicating with the MNO server.

According to an embodiment of the disclosure, the SSD 410-3, 420-3, or 430-3 and the CASD 410-4, 420-4, or 430-4 may include information for performing a security processing operation on a profile.

According to an embodiment of the disclosure, the applets 410-5, 420-5, or 430-5 may include various application information associated with a user of the profile.

According to an embodiment of the disclosure, the NAAs 410-6, 420-6, or 430-6 may include application information which allows the profile to access a network.

According to an embodiment of the disclosure, the file system 410-7, 420-7, or 430-7 may include a file system associated with each information of the profile.

According to an embodiment of the disclosure, the profile metadata 410-8, 420-8, or 430-8 may also be referred to as a profile record, and may include metadata information about the profile in a text form. The metadata information may include at least one of an integrated circuit card ID (ICCID) of the profile, a profile name, a name of an MNO providing the profile, a user's profile nickname, an icon, a profile class, notification configuration information, profile owner information, or a PPR.

According to an embodiment of the disclosure, the ICCID of the profile, as a profile ID, may indicate a unique ID of each profile. The name of the profile may include a name of each profile. The name of the MNO providing the profile may include a name of a communication provider which provides the profile. The user's profile nickname may include a profile nickname specified by the user. The icon may include an icon corresponding to the profile. The profile class may include information indicating whether a type of the profile is a provisioning profile or an operational profile. The notification configuration information may include an address of a server (e.g., the SM-DP+ server) to receive notifications. The profile owner information may include a mobile country code (MCC), a mobile network code (MNC), and/or a group identifier (GID) associated with a profile owner. For example, the MCC may be a code for identifying a country, and the MNC may be a code for identifying a mobile communication provider. The GID may be code area information for identifying a group or an area to which the profile belongs. According to an embodiment of the disclosure, an area may include a group including a plurality of countries. The PPR may include policy rule information for managing the profile.

According to an embodiment of the disclosure, the electronic device may identify whether it is a provisioning profile or an operational profile using the profile class information of the profile metadata 410-8, 420-8, or 430-8 included in each of at least one profile 410, 420, or 430 included in the eUICC 401 and enable or disable each of the provisioning profile or the operational profile via the LPA.

Figure 5A:
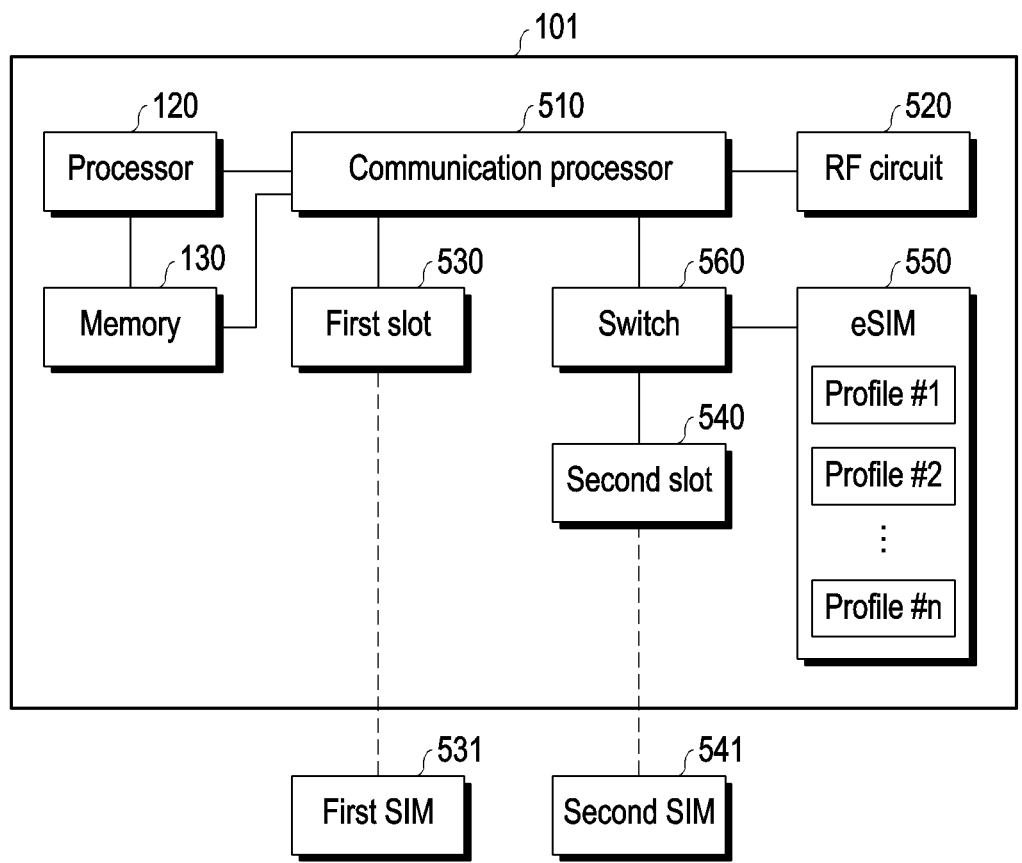
FIG. 5A is a block diagram schematically illustrating an internal structure of an electronic device according to an embodiment of the disclosure.

FIG. 5A is a block diagram schematically illustrating an internal structure of an electronic device according to an embodiment of the disclosure.

Referring to FIG. 5A, an electronic device 101 (e.g., an electronic device 101 in FIG. 1, 2, or 3) may include at least one of a processor 120 (e.g., the processor 120 in FIG. 1 or 3), a communication processor 510, a radio frequency (RF) circuit 520, a memory 130 (e.g., a memory 130 in FIG. 1), a first slot 530, a second slot 540, an eSIM 550, or a switch 560.

The communication processor 510 may establish a communication channel in a band which is to be used for a wireless communication, and support a network communication through the established communication channel. For example, the communication processor 510 may support at least one of $2^{nd}$ generation (2G), $3^{rd}$ generation (3G), $4^{th}$ generation (4G), or $5^{th}$ generation (5G) network communication. The RF circuit 520 may include at least one of a radio frequency integrated circuit (RFIC), a radio frequency front end (RFFE) module, or an antenna module. The RF circuit 520 may convert data (e.g., a baseband signal) outputted from the communication processor 510 into an RF signal, and transmit the RF signal via the antenna module. Or, the RF circuit 520 may convert an RF signal received via the antenna module (e.g., an antenna module 197 in FIG. 1) into a baseband signal, and transfer the baseband signal to the communication processor 510. The RF circuit 520 may process an RF signal or a baseband signal based on a communication scheme supported by the communication processor 510, and a type of the RF circuit 520 is not limited. According to an embodiment of the disclosure, an interface between components may be implemented as a general purpose input/output (GPIO), universal asynchronous receiver/transmitter (UART) (e.g., high speed-UART (HS-UART)) or peripheral component interconnect bus express (PCIe) interface, and there is no limitation to the interface between the components. Alternatively, at least some of the components may exchange control information or packet data information using a shared memory.

Although FIG. 5A illustrates a case in which the processor 120 and the communication processor 510 are implemented as separate hardware, this is merely exemplary. The processor 120 and the communication processor 510 may be implemented as separate hardware, but the processor 120 and the communication processor 510 may be implemented in a single chip.

According to an embodiment of the disclosure, the communication processor 510 may perform an authenticating operation which is based on information stored in an SIM. The communication processor 510 may be connected to the first SIM 531 through the first slot 530. For example, the first SIM 531 may be connected to a stack (e.g., a stack according to ISO7816) of the communication processor 510. In FIG. 5A, the communication processor 510 may include two stacks. For example, the first slot 530 may accommodate the first SIM 531 which is an rSIM, and if the first SIM 531 is accommodated, the first slot 530 may include at least one terminal capable of transferring information from the first SIM 531 to the communication processor 510. The second slot 540 may accommodate the second SIM 541 which is an rSIM, and if the second SIM 541 is accommodated, the second slot 540 may include at least one terminal capable of transferring information from the second SIM 541 to the communication processor 510. A type of the first slot 530 may be identical to or different from a type of the second slot 540. The communication processor 510 may obtain information stored in the first SIM 531 from the first SIM 531 accommodated in the first slot 530. For example, in at least one of the first SIM 531, the second SIM 541, or the eSIM 550 (e.g., an eSIM 201 in FIG. 3), at least one of an ICCID, an IMSI, home public land mobile network (HPLMN)-related information, or a mobile subscriber international ISDN number (MSISIDN) may be stored. The at least one of the ICCID, the IMSI, the HPLMN-related information, or the MSISIDN which is stored in the at least one of the first SIM 531, the second SIM 541, or the eSIM 550 (e.g., an eSIM 201 in FIG. 3) may be referred to as an "EF". The communication processor 510 may perform, via the RF circuit 520, an authenticating operation for a network communication which corresponds to the first SIM 531, based on the obtained information stored in the first SIM 531. If authentication is successful, the communication processor 510 may perform the network communication which corresponds to the first SIM 531 via the RF circuit 520.

According to an embodiment of the disclosure, at least one of the processor 120 or the communication processor 510 may control a state of the switch 560. The state of the switch 560 may be either a first state connecting the communication processor 510 and the second slot 540 or a second state connecting the communication processor 510 and the eSIM 550. For example, at least one of the processor 120 or the communication processor 510 may control the switch 560 to connect the second slot 540 to the communication processor 510. In an embodiment of the disclosure, at least one of the processor 120 or the communication processor 510 may provide the switch 560 with a control signal for controlling the state of the switch 560 to the first state. If a normal state in which the switch 560 does not receive a specific signal is the first state, at least one of the processor 120 or the communication processor 510 may perform no special operation to connect the second slot 540 to the communication processor 510. For example, a signal for controlling the switch 560 may be transferred through a GPIO, but an interface used for transferring the signal for controlling the switch 560 is not limited. In an embodiment of the disclosure, the state of the switch 560 may be controlled in a third state in which it is connected to neither the second slot 540 nor the eSIM 550. In an embodiment of the disclosure, the switch 560 may include at least one metal oxide semiconductor field effect transistor (MOSFET), or a freewheeling switch, but a type thereof may not be limited.

Figure 5B:
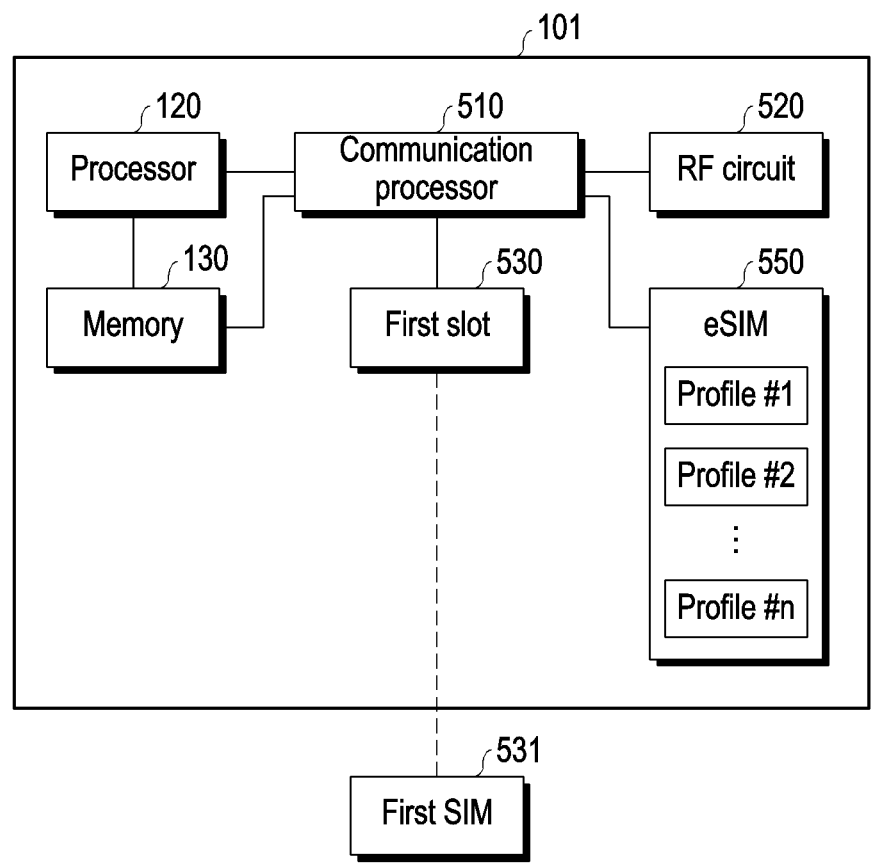
FIG. 5B is a block diagram schematically illustrating an internal structure of an electronic device according to an embodiment of the disclosure.

FIG. 5B is a block diagram schematically illustrating an internal structure of an electronic device according to an embodiment of the disclosure.

Referring to FIG. 5B, an electronic device 101 (e.g., an electronic device 101 in FIG. 1, 2, or 3) may include at least one of a processor 120 (e.g., the processor 120 in FIG. 1 or 3), a communication processor 510, an RF circuit 520, a memory 130 (e.g., a memory 130 in FIG. 1), a first slot 530, or an eSIM 550. Among components included in FIG. 5B, the same components as those included in FIG. 5A may operate in the same manner as those included in FIG. 5A, so a detailed description thereof will be omitted.

According to an embodiment of the disclosure, the communication processor 510 may perform an authenticating operation which is based on information stored in an SIM. The communication processor 510 may be connected to the first SIM 531 through the first slot 530. For example, the first SIM 531 may be connected to a stack (e.g., a stack according to ISO7816) of the communication processor 510. In FIG. 5B, the communication processor 510 may include two stacks. For example, the first slot 530 may accommodate the first SIM 531 which is an rSIM, and if the first SIM 531 is accommodated, the first slot 530 may include at least one terminal capable of transferring information from the first SIM 531 to the communication processor 510. The communication processor 510 may perform, via the RF circuit 520, an authenticating operation for a network communication which corresponds to the first SIM 531, based on the obtained information stored in the first SIM 531. If authentication is successful, the communication processor 510 may perform the network communication which corresponds to the first SIM 531 via the RF circuit 520.

According to an embodiment of the disclosure, at least one of the processor 120 and the communication processor 510 may be connected to the eSIM 550. At least one of the processor 120 or the communication processor 510 may select any one profile from among a plurality of profiles included in the eSIM 550, and perform a network communication which corresponds to the corresponding profile.

Figure 5C:
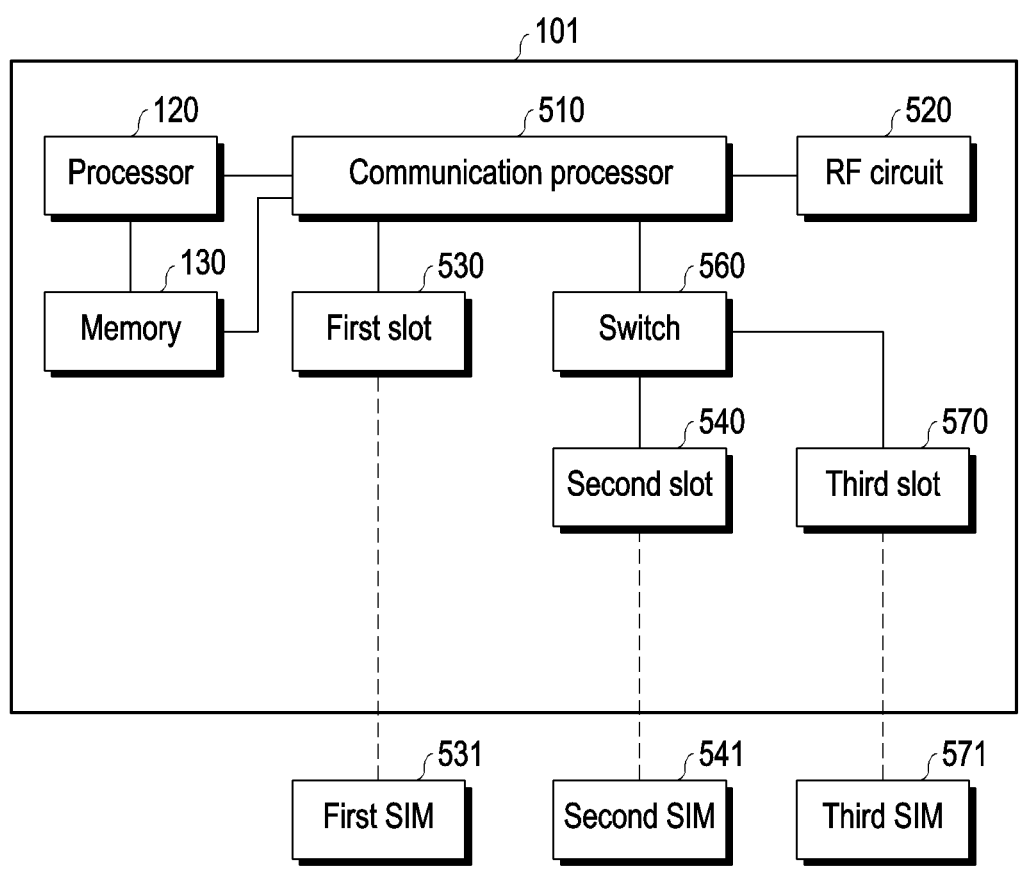
FIG. 5C is a block diagram schematically illustrating an internal structure of an electronic device according to an embodiment of the disclosure.

FIG. 5C is a block diagram schematically illustrating an internal structure of an electronic device according to an embodiment of the disclosure.

Referring to FIG. 5C, an electronic device 101 (e.g., an electronic device 101 in FIG. 1, 2, or 3) may include at least one of a processor 120 (e.g., the processor 120 in FIG. 1 or 3), a communication processor 510, an RF circuit 520, a memory 130, a first slot 530, a second slot 540, a third slot 570, or a switch 560. Among components included in FIG. 5C, the same components as those included in FIG. 5A may operate in the same manner as those included in FIG. 5A, so a detailed description thereof will be omitted.

According to an embodiment of the disclosure, the communication processor 510 may perform an authenticating operation which is based on information stored in an SIM. The communication processor 510 may be connected to the first SIM 531 through the first slot 530. For example, the first SIM 531 may be connected to a stack (e.g., a stack according to ISO7816) of the communication processor 510. In FIG. 5C, the communication processor 510 may include two stacks. For example, the first slot 530 may accommodate the first SIM 531 which is an rSIM, and if the first SIM 531 is accommodated, the first slot 530 may include at least one terminal capable of transferring information from the first SIM 531 to the communication processor 510. The second slot 540 may accommodate the second SIM 541 which is an rSIM, and if the second SIM 541 is accommodated, the second slot 540 may include at least one terminal capable of transferring information from the second SIM 541 to the communication processor 510. The third slot 570 may accommodate the third SIM 571 which is an rSIM, and if the third SIM 571 is accommodated, the third slot 570 may include at least one terminal capable of transferring information from the third SIM 571 to the communication processor 510. Types of the first slot 530, the second slot 540, and the third slot 570 may be the same or different.

The communication processor 510 may obtain information stored in the first SIM 531 from the first SIM 531 accommodated in the first slot 530. For example, in at least one of the first SIM 531, the second SIM 541, or the third SIM 571, at least one of an ICCID, an IMSI, HPLMN-related information, or an MSISIDN may be stored. The at least one of the ICCID, the IMSI, the HPLMN-related information, or the MSISIDN which is stored in the at least one of the first SIM 531, the second SIM 541, or the third SIM 571 may be referred to as an "EF". The communication processor 510 may perform, via the RF circuit 520, an authenticating operation for a network communication which corresponds to the first SIM 531, based on the obtained information stored in the first SIM 531. If authentication is successful, the communication processor 510 may perform the network communication which corresponds to the first SIM 531 via the RF circuit 520.

According to an embodiment of the disclosure, at least one of the processor 120 or the communication processor 510 may control a state of the switch 560. The state of the switch 560 may be either a first state connecting the communication processor 510 and the second slot 540 or a second state connecting the communication processor 510 and the third slot 570. For example, at least one of the processor 120 or the communication processor 510 may control the switch 560 to connect the second slot 540 to the communication processor 510. In an embodiment of the disclosure, at least one of the processor 120 or the communication processor 510 may provide the switch 560 with a control signal for controlling the state of the switch 560 to the first state. If a normal state in which the switch 560 does not receive a designated signal is the first state, at least one of the processor 120 or the communication processor 510 may perform no special operation to connect the second slot 540 to the communication processor 510. In an embodiment of the disclosure, a signal for controlling the switch 560 may be transferred through a GPIO, but an interface used for transferring the signal for controlling the switch 560 is not limited. In an embodiment of the disclosure, the state of the switch 560 may be controlled in a third state in which it is connected to neither the second slot 540 nor the third slot 570. For example, the switch 560 may include at least one MOSFET, or a freewheeling switch, but a type thereof may not be limited.

An embodiment of the disclosure may provide an electronic device which adaptively provides SIM setting and an operating method thereof.

An embodiment of the disclosure may provide an electronic device which adaptively provides SIM setting appropriate for each service and an operating method thereof.

According to an embodiment of the disclosure, an electronic device (e.g., an electronic device 101 in FIG. 1, 3, or 6) may comprise a memory (e.g., a memory 130 in FIG. 1, 5A, 5B, or 5C) and at least one processor (e.g., the processor 120 in FIG. 1, 3, 5A, 5B, or 5C) operatively connected to the memory (e.g., the memory 130 in FIG. 1, 5A, 5B, or 5C).

Figure 6:
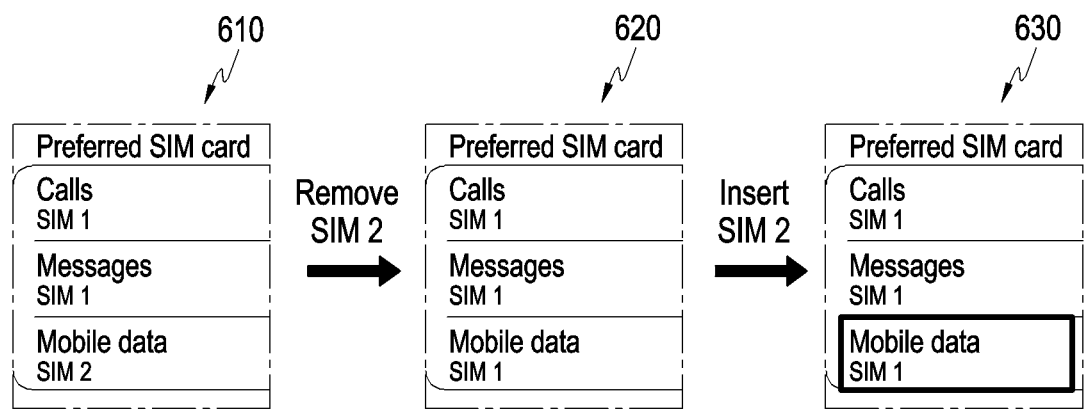
FIG. 6 is a diagram illustrating a screen displayed on an electronic device according to an embodiment of the disclosure.

According to an embodiment of the disclosure, the at least one processor (e.g., the processor 120 in FIG. 1, 3, 5A, 5B, or 5C) may be configured to, based on a subscriber identity module (SIM) change event, in which at least one SIM is inserted, occurring, identify whether SIM-related information related to the at least one SIM exists in a database which is stored in the memory (e.g., the memory 130 in FIG. 1, 5A, 5B, or 5C) and includes SIM setting information for services provided by the electronic device (e.g., the electronic device 101 in FIG. 1, 3, or 6).

According to an embodiment of the disclosure, the at least one processor (e.g., the processor 120 in FIG. 1, 3, 5A, 5B, or 5C) may be further configured to, in case of being identified that the SIM-related information exists in the database, select a SIM for each of the services based on the SIM setting information.

According to an embodiment of the disclosure, the at least one processor (e.g., the processor 120 in FIG. 1, 3, 5A, 5B, or 5C) may be further configured to, based on assignment time of SIMs assigned for the services included in the SIM setting information, select one of a plurality of SIMs including the at least one SIM as a SIM for one of the services.

According to an embodiment of the disclosure, the at least one processor (e.g., the processor 120 in FIG. 1, 3, 5A, 5B, or 5C) may be configured to, based on most recent assignment time among the assignment time of the SIMs assigned for the services, select the one of the plurality of SIMs as the SIM of the one of the services.

According to an embodiment of the disclosure, the at least one processor (e.g., the processor 120 in FIG. 1, 3, 5A, 5B, or 5C) may be configured to identify whether at least one service, for which a SIM is not selected among the services, exists.

According to an embodiment of the disclosure, the at least one processor (e.g., the processor 120 in FIG. 1, 3, 5A, 5B, or 5C) may be configured to, in case of being identified that the at least one service exists, select one of a plurality of SIMs including the at least one SIM as a SIM for the at least one service, based on at least one of a promotion package, a radio access technology (RAT), or account information for each of the plurality of SIMs.

According to an embodiment of the disclosure, the at least one processor (e.g., the processor 120 in FIG. 1, 3, 5A, 5B, or 5C) may be further configured to select a SIM which corresponds to a promotion package having lowest cost for the at least one service from among promotion packages for the plurality of SIMs as the SIM for the at least one service, select a SIM of a latest version from among versions of RATs for the plurality of SIMs as the SIM for the at least one service, or select a SIM which corresponds to account information having largest account balance from among account information for the plurality of SIMs as the SIM for the at least one service.

According to an embodiment of the disclosure, the electronic device (e.g., the electronic device 101 in FIG. 1, 3, or 6) may further comprise a display module (e.g., a display module 160 in FIG. 1).

According to an embodiment of the disclosure, the at least one processor (e.g., the processor 120 in FIG. 1, 3, 5A, 5B, or 5C) may be further configured to display, via the display module (e.g., the display module 160 in FIG. 1), recommended SIM setting information indicating a SIM selected for each of the services.

According to an embodiment of the disclosure, the electronic device (e.g., the electronic device 101 in FIG. 1, 3, or 6) may further comprise an input module (e.g., the input module 150 in FIG. 1 or 3).

According to an embodiment of the disclosure, the at least one processor (e.g., the processor 120 in FIG. 1, 3, 5A, 5B, or 5C) may be further configured to detect, via the input module (e.g., the input module 150 in FIG. 1 or 3), that a signal indicating that the recommended SIM setting information is to be used as the SIM setting information is inputted.

According to an embodiment of the disclosure, the at least one processor (e.g., the processor 120 in FIG. 1, 3, 5A, 5B, or 5C) may be further configured to update the SIM setting information based on the recommended SIM setting information.

According to an embodiment of the disclosure, the at least one processor (e.g., the processor 120 in FIG. 1, 3, 5A, 5B, or 5C) may be configured to, in case of being identified that the SIM-related information does not exist in the database, identify whether at least one service, for which a SIM is not selected among the services, exists.

According to an embodiment of the disclosure, the at least one processor (e.g., the processor 120 in FIG. 1, 3, 5A, 5B, or 5C) may be configured to, in case of being identified that the at least one service exists, select one of a plurality of SIMs including the at least one SIM as a SIM for the at least one service, based on at least one of a promotion package, a radio access technology (RAT), or account information for each of the plurality of SIMs.

According to an embodiment of the disclosure, the electronic device (e.g., the electronic device 101 in FIG. 1, 3, or 6) may further comprise a display module 160.

According to an embodiment of the disclosure, the at least one processor (e.g., the processor 120 in FIG. 1, 3, 5A, 5B, or 5C) may be further configured to display, via the display module (e.g., the display module 160 in FIG. 1), recommended SIM setting information indicating a SIM selected for each of the services.

According to an embodiment of the disclosure, the electronic device (e.g., the electronic device 101 in FIG. 1, 3, or 6) may further comprise an input module 150.

According to an embodiment of the disclosure, the at least one processor (e.g., the processor 120 in FIG. 1, 3, 5A, 5B, or 5C) may be further configured to detect, via the input module (e.g., the input module 150 in FIG. 1 or 3), that a signal indicating that the recommended SIM setting information is to be used as the SIM setting information is inputted.

According to an embodiment of the disclosure, the at least one processor (e.g., the processor 120 in FIG. 1, 3, 5A, 5B, or 5C) may be further configured to update the SIM setting information to the recommended SIM setting information.

According to an embodiment of the disclosure, an electronic device (e.g., an electronic device 101 in FIG. 1, 2, 3, 5A, 5B, or 5C) may comprise a memory (e.g., a memory 130 in FIG. 1, 5A, 5B, or 5C) and at least one processor (e.g., the processor 120 in FIG. 1, 3, 5A, 5B, or 5C) operatively connected to the memory (e.g., the memory 130 in FIG. 1, 5A, 5B, or 5C).

According to an embodiment of the disclosure, the at least one processor (e.g., the processor 120 in FIG. 1, 3, 5A, 5B, or 5C) may be configured to, based on a subscriber identity module (SIM) change event, in which at least one SIM is inserted, occurring, identify whether a number of SIMs inserted into the electronic device (e.g., the electronic device 101 in FIG. 1, 2, 3, 5A, 5B, or 5C) is two or more.

According to an embodiment of the disclosure, the at least one processor (e.g., the processor 120 in FIG. 1, 3, 5A, 5B, or 5C) may be further configured to, in case of being identified that the number of the SIMs is two or more, identify whether the SIMs are included in a first SIM group.

According to an embodiment of the disclosure, the at least one processor (e.g., the processor 120 in FIG. 1, 3, 5A, 5B, or 5C) may be further configured to, in case of being identified that the SIMs are included in the first SIM group, select a SIM for each of services provided by the electronic device (e.g., the electronic device 101 in FIG. 1, 2, 3, 5A, 5B, or 5C), based on a database, which is stored in the memory (e.g., the memory 130 in FIG. 1, 5A, 5B, or 5C) and includes SIM setting information for the services provided by the electronic device (e.g., the electronic device 101 in FIG. 1, 2, 3, 5A, 5B, or 5C), for each of a plurality of SIM groups including the first SIM group.

According to an embodiment of the disclosure, the electronic device (e.g., the electronic device 101 in FIG. 1, 2, 3, 5A, 5B, or 5C) may further comprise a display module (e.g., the display module 160 in FIG. 1).

According to an embodiment of the disclosure, the at least one processor (e.g., the processor 120 in FIG. 1, 3, 5A, 5B, or 5C) may be further configured to display, via the display module (e.g., the display module 160 in FIG. 1), recommended SIM setting information indicating a SIM selected for each of the services.

According to an embodiment of the disclosure, the electronic device (e.g., the electronic device 101 in FIG. 1, 2, 3, 5A, 5B, or 5C) may further comprise an input module (e.g., the input module 150 in FIG. 1 or 3).

According to an embodiment of the disclosure, the at least one processor (e.g., the processor 120 in FIG. 1, 3, 5A, 5B, or 5C) may be further configured to detect, via the input module (e.g., the input module 150 in FIG. 1 or 3), that a signal indicating that the recommended SIM setting information is to be used as the SIM setting information is inputted.

According to an embodiment of the disclosure, the at least one processor (e.g., the processor 120 in FIG. 1, 3, 5A, 5B, or 5C) may be further configured to update SIM setting information for the first SIM group to the recommended SIM According to an embodiment of the disclosure, the at least one processor (e.g., the processor 120 in FIG. 1, 3, 5A, 5B, or 5C) may be further configured to, in case of being identified that the number of SIMs inserted into the electronic device (e.g., the electronic device 101 in FIG. 1, 2, 3, 5A, 5B, or 5C) is one or that at least some of the two or more SIMs are not included in the first SIM group, identify whether SIM-related information related to the at least one SIM exists in another database which is stored in the memory (e.g., the memory 130 in FIG. 1, 5A, 5B, or 5C) and includes the SIM setting information for services provided by the electronic device (e.g., the electronic device 101 in FIG. 1, 2, 3, 5A, 5B, or 5C).

According to an embodiment of the disclosure, the at least one processor (e.g., the processor 120 in FIG. 1, 3, 5A, 5B, or 5C) may be further configured to, in case of being identified that the SIM-related information exists in the other database, select a SIM for each of the services based on the SIM setting information.

According to an embodiment of the disclosure, the at least one processor (e.g., the processor 120 in FIG. 1, 3, 5A, 5B, or 5C) may be configured to, based on assignment time of SIMs assigned for the services included in the SIM setting information, select one of a plurality of SIMs including the at least one SIM as a SIM for one of the services.

According to an embodiment of the disclosure, the at least one processor (e.g., the processor 120 in FIG. 1, 3, 5A, 5B, or 5C) may be configured to identify whether at least one service, for which a SIM is not selected among the services, exists.

According to an embodiment of the disclosure, the at least one processor (e.g., the processor 120 in FIG. 1, 3, 5A, 5B, or 5C) may be configured to, in case of being identified that the at least one service exists, select one of a plurality of SIMs including the at least one SIM as a SIM for the at least one service, based on at least one of a promotion package, a radio access technology (RAT), or account information for each of the plurality of SIMs.

According to an embodiment of the disclosure, an electronic device (e.g., an electronic device 101 in FIG. 1, 2, 3, 5A, 5B, or 5C) may comprise a memory (e.g., a memory 130 in FIG. 1, 5A, 5B, or 5C) and at least one processor (e.g., a processor 120 in FIG. 1, 3, 5A, 5B, or 5C) operatively connected to the memory (e.g., the memory 130 in FIG. 1, 5A, 5B, or 5C).

According to an embodiment of the disclosure, the at least one processor (e.g., the processor 120 in FIG. 1, 3, 5A, 5B, or 5C) may be configured to, based on a subscriber identity module (SIM) change event, in which at least one SIM is inserted, occurring, identify whether an Internet connection is possible.

According to an embodiment of the disclosure, the at least one processor (e.g., the processor 120 in FIG. 1, 3, 5A, 5B, or 5C) may be further configured to, in case of being identified that the Internet connection is possible, synchronize a first database which is stored in the memory (e.g., the memory 130 in FIG. 1, 5A, 5B, or 5C) and includes SIM setting information for services provided by the electronic device (e.g., the electronic device 101 in FIG. 1, 2, 3, 5A, 5B, or 5C) with a second database stored in an external electronic device (e.g., the server 108 in FIG. 1).

According to an embodiment of the disclosure, the at least one processor (e.g., the processor 120 in FIG. 1, 3, 5A, 5B, or 5C) may be further configured to identify whether the SIM setting information exists in at least one active SIM among active SIMs inserted in the electronic device (e.g., the electronic device 101 in FIG. 1, 2, 3, 5A, 5B, or 5C).

According to an embodiment of the disclosure, the at least one processor (e.g., the processor 120 in FIG. 1, 3, 5A, 5B, or 5C) may be further configured to, in case of being identified that the SIM setting information exists in the at least one active SIM, identify whether the SIM setting information existing in the active SIM is latest SIM setting information.

According to an embodiment of the disclosure, the at least one processor (e.g., the processor 120 in FIG. 1, 3, 5A, 5B, or 5C) may be further configured to, in case of being identified that the SIM setting information existing in the active SIM is the latest SIM setting information, synchronize the first database with the latest SIM setting information.

According to an embodiment of the disclosure, the at least one processor (e.g., the processor 120 in FIG. 1, 3, 5A, 5B, or 5C) may be further configured to identify whether SIM-related information related to the at least one SIM exists in the first database.

According to an embodiment of the disclosure, the at least one processor (e.g., the processor 120 in FIG. 1, 3, 5A, 5B, or 5C) may be further configured to, in case of being identified that the SIM-related information exists in the first database, select a SIM for each of the services based on the latest SIM setting information.

According to an embodiment of the disclosure, the at least one processor (e.g., the processor 120 in FIG. 1, 3, 5A, 5B, or 5C) may be configured to, based on assignment time of SIMs assigned for the services included in the latest SIM setting information, select one of a plurality of SIMs including the at least one SIM as a SIM for one of the services.

According to an embodiment of the disclosure, the at least one processor (e.g., the processor 120 in FIG. 1, 3, 5A, 5B, or 5C) may be configured to identify whether at least one service, for which a SIM is not selected among the services, exists.

According to an embodiment of the disclosure, the at least one processor (e.g., the processor 120 in FIG. 1, 3, 5A, 5B, or 5C) may be configured to, in case of being identified that the at least one service exists, select one of a plurality of SIMs including the at least one SIM as a SIM for the at least one service, based on at least one of a promotion package, a radio access technology (RAT), or account information for each of the plurality of SIMs.

FIG. 6 is a diagram illustrating a screen displayed on an electronic device according to an embodiment of the disclosure.

Referring to FIG. 6, an electronic device (e.g., an electronic device 101 in FIG. 1, 2, or 3) may include a plurality of SIMs (e.g., two SIMs). For example, the two SIMs may include a SIM1 and a SIM2.

The electronic device may manage SIM settings through a SIM card manager. In an embodiment of the disclosure, the SIM setting may mean SIM assignment to each of a plurality of services provided by the electronic device, and SIM setting information may include information about a SIM assigned to each of the plurality of services provided by the electronic device. For example, if the electronic device provides a call service, a message service, and/or a mobile data service, and a SIM 1, the SIM 1, and/or a SIM 2 are assigned to the call service, the message service, and/or the mobile data service, respectively, SIM setting information may be information indicating that the SIM 1, the SIM 1, and/or the SIM 2 are assigned to the call service, the message service, and/or the mobile data service, respectively.

In an embodiment of the disclosure, if there is one active SIM (e.g., the SIM 1) among SIMs included in the electronic device, the SIM card manager may set the SIM 1 as a default SIM for all services provided by the electronic device.

In an embodiment of the disclosure, if there are a plurality of active SIMs (e.g., the SIM 1 and the SIM 2) among the SIMs included in the electronic device, the SIM card manager may assign, as a SIM for an arbitrary service, a SIM which corresponds to a subscriber ID (Sub ID) in the most recent SIM session. In an embodiment of the disclosure, the Sub ID may be generated based on a UICC ID.

For example, in FIG. 6, if the SIM 1 and the SIM 2 are in an active state in state 1 610, the SIM 1 may be assigned to the call service and the message service, and the SIM 2 may be assigned to the mobile data service. In FIG. 6, for convenience, the call service is illustrated as "calls", the message service is illustrated as "messages", and the mobile data service is illustrated as "mobile data".

While the electronic device is providing services via the SIM 1 and the SIM 2, the SIM 2 may be removed in state 2 620. As the SIM 2 is removed, only one active SIM (e.g., the SIM 1) exists, and the electronic device may assign the SIM 1 to all services provided by the electronic device. For example, in the state 1 610, the SIM 2 has been assigned to the mobile data service, but in the state 2 620, the SIM 1 may be assigned to the mobile data service.

While the electronic device is providing services via the SIM 1, the SIM 2 may be inserted in a state 3 630. If the SIM 2 is inserted into the electronic device, because a SIM assigned to the latest SIM session is the SIM 1, the electronic device may assign the SIM 1 to all services provided by the electronic device. For example, in the state 1 610, the SIM 2 is assigned to the mobile data service, but in the state 3 630, the SIM 1 may be assigned to the mobile data service.

In an embodiment of the disclosure, if there are the plurality of active SIMs (e.g., the SIM 1 and the SIM 2) among the SIMs included in the electronic device and the SIM card manager is impossible to identify the SIM assigned to the most recent SIM session for the arbitrary service, the SIM card manager may assign, as a SIM for the arbitrary service, a SIM which corresponds to a previous slot ID (e.g., a slot 1 or a slot 2).

In an embodiment of the disclosure, if a SIM is inserted into the electronic device, a user may need to manually select a SIM for each of all services provided by the electronic device. If the user manually selects the SIM for each of all services, a case may occur that the user selects a wrong SIM for a specific service. For example, the user of the electronic device may select the SIM 1 for the call service and the message service as in the state 1 610, but may select the SIM 1 by mistake for the mobile data service, unlike the state 1 610. In this case, although the SIM 1 needs to be selected for the mobile data service, because the SIM 2 is incorrectly selected, it may be difficult to provide the user with an appropriate (e.g., optimal) service.

In an embodiment of the disclosure, if an eSIM is used in another electronic device other than an electronic device in which the eSIM is previously used, SIM setting information of the eSIM may not be restored in the other electronic device.

The disclosure proposes an electronic device for adaptively providing SIM setting suitable for a user of the electronic device based on SIM setting information, SIM group setting information, and/or a SIM setting rule, and an operating method thereof, and a detailed description thereof is as follows.

Figure 7:
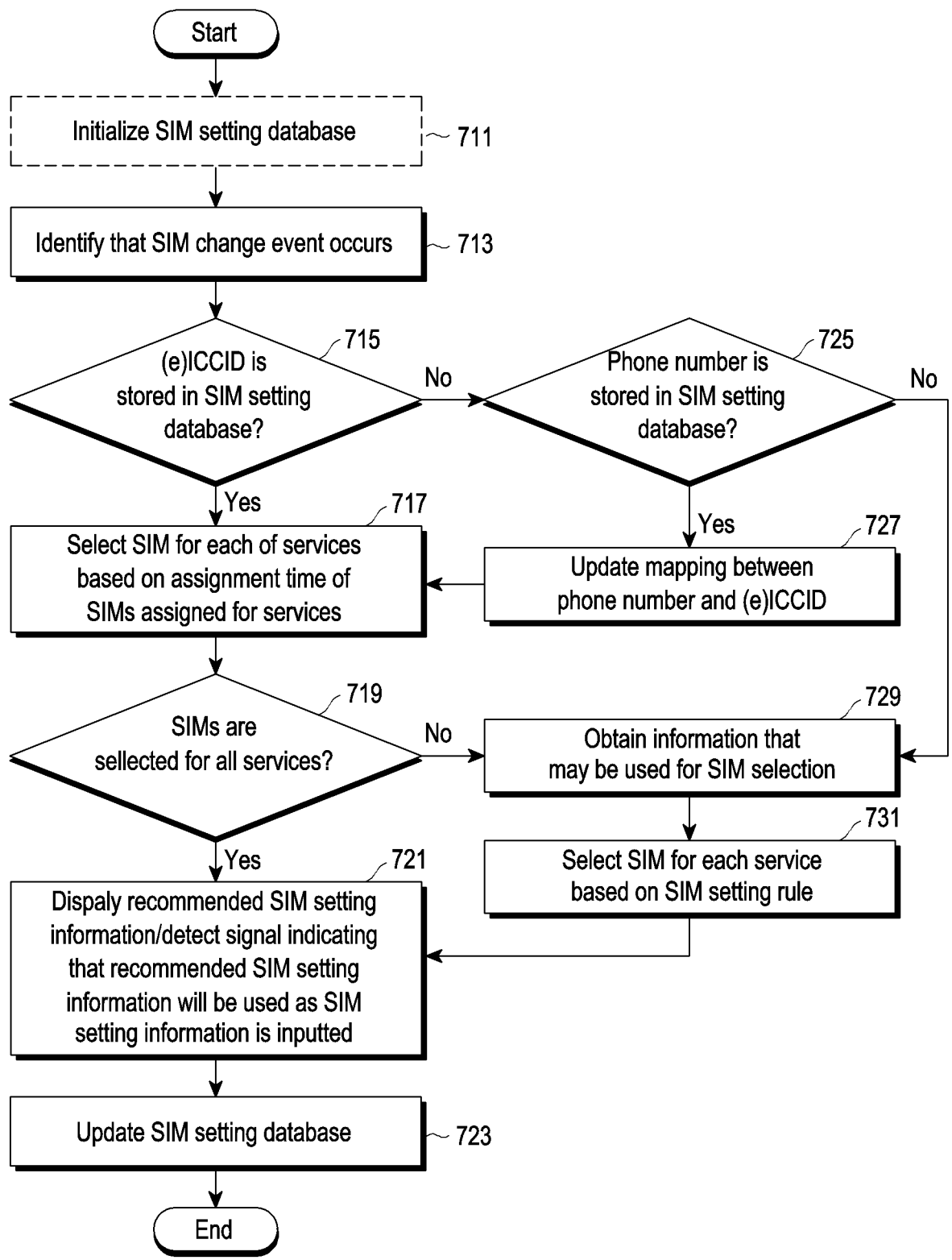
FIG. 7 is a flowchart illustrating an operating process of an electronic device according to an embodiment of the disclosure.

FIG. 7 is a flowchart illustrating an operating process of an electronic device according to an embodiment of the disclosure.

Referring to FIG. 7, a processor (e.g., the processor 120 in FIG. 1, 3, 5A, 5B, or 5C) of an electronic device (e.g., an electronic device 101 in FIG. 1, 3, 5A, 5B, or 5C) may initialize a SIM setting database (or a subscriber setting history database) in operation 711.

In an embodiment of the disclosure, the SIM setting database may be initialized if the electronic device is first booted or if the electronic device starts operating after being factory reset. So, operation 711 may not be performed every time, but may be performed only once if the electronic device is first booted or if the electronic device starts operating after being factory reset. In an embodiment of the disclosure, the SIM setting database may be stored in a memory (e.g., a memory 130 in FIG. 1, 3, 5A, 5B, or 5C) of the electronic device. In an embodiment of the disclosure, the SIM setting database may include at least one of subscriber information (e.g., a phone number) related to each subscriber, SIM card information (e.g., an (e)ICCID)) of each subscriber, or a timestamp when each subscriber is provided with a service. In an embodiment of the disclosure, subscriber information and SIM card information may be included in information related to a SIM (e.g., SIM-related information). In an embodiment of the disclosure, assigning a subscriber to a service may mean assigning a SIM to a service.

In an embodiment of the disclosure, the SIM setting database may be updated if any one of the following conditions is satisfied.

(1) Condition 1

Case that a new SIM card is inserted into the electronic device or an eSIM profile is changed If the condition 1 is satisfied, the processor may obtain at least one of a phone number or an (e) an ICCID for a new SIM card or a changed eSIM profile. The processor may update the obtained, the at least one of the phone number or the (e)ICCID for the new SIM card or the changed eSIM profile to the SIM setting database.

(2) Condition 2

Case that a Default SIM for a Service is Changed

If the condition 2 is satisfied, the processor may update a timestamp for the service. The timestamp for the service may not change even if a default SIM card corresponding to the default SIM is removed from the electronic device.

Hereinafter, an example of an operation in which an electronic device initializes or updates a SIM setting database according to an embodiment will be described with reference to FIG. 8.

Figure 8:
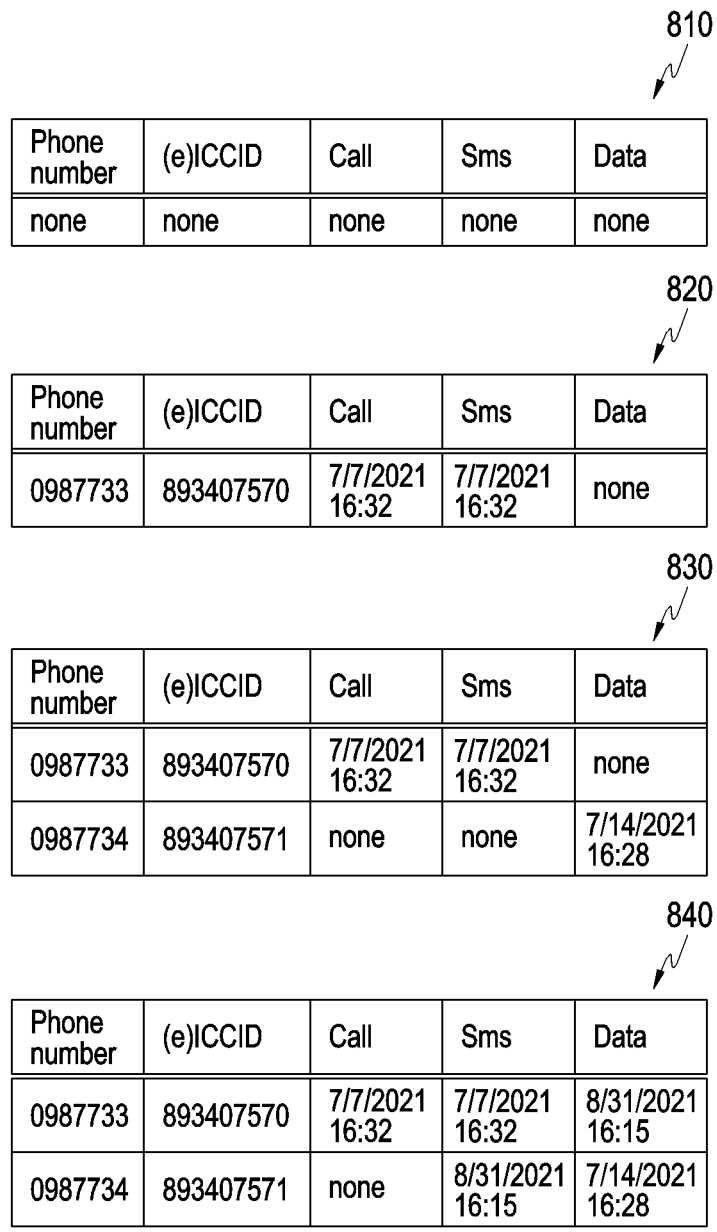
FIG. 8 is a diagram illustrating an operation in which an electronic device initializes or updates a subscriber identity module (SIM) setting database according to an embodiment of the disclosure.

FIG. 8 is a diagram illustrating an operation in which an electronic device initializes or updates a SIM setting database according to an embodiment of the disclosure.

Referring to FIG. 8, a reference numeral 810 may indicate an example of a structure of a SIM setting database in a case that an electronic device initializes the SIM setting database. As described in operation 711 in FIG. 7, the SIM setting database may be initialized only once if the electronic device is first booted or if the electronic device starts operating after being factory reset. In the initialized SIM setting database 810, all of a phone number, an (e) ICCID, Call, SMS, and Data may be initialized to "none". In an embodiment of the disclosure, the phone number may be an example of subscriber information, and the (e) ICCID may be an example of SIM card information. In an embodiment of the disclosure, the Call may indicate a timestamp for a call service, the SMS may indicate a timestamp for a message service (e.g., a short message service (SMS)), or the Data may indicate a timestamp for a mobile data service.

A reference numeral 820 may indicate a SIM setting database in a case that a SIM (e.g., a SIM 1) whose phone number is "0987733" is inserted into the electronic device and the SIM 1 is set as a default SIM for the call service and the SMS. For example, the reference numeral 820 may indicate an updated SIM setting database in a case that the SIM 1 whose phone number is "0987733" is inserted into the electronic device. In the SIM setting database 820, the phone number may be set to "0987733", the (e)ICCID may be set to "893407570" which is an (e)ICCID of the SIM 1, the Call may be set to "7/7/2021 16:32" which is a timestamp at which the SIM 1 is set for the call service, and the SMS may be set to "7/7/2021 16:32" which is a timestamp at which the SIM 1 is set for the SMS. Because a SIM is not set for the mobile data service, the Data in the SIM setting database 820 may still be maintained in an initialized state.

A reference numeral 830 may indicate a SIM setting database in a case that another SIM, e.g., a SIM (e.g., a SIM 2) whose phone number is "0987734" is inserted into the electronic device and the SIM 2 is set as a default SIM for the mobile data service. For example, the reference numeral 830 may indicate an updated SIM setting database in a case that the SIM 2 whose phone number is "0987734" is additionally inserted into the electronic device. In the SIM setting database 830, the phone number may be set to "0987734", the (e)ICCID may be set to "893407571" which is an (e)ICCID of the SIM 2, and the Data may be set to "7/14/2021 16:28" which is a timestamp at which the SIM 2 is set for the mobile data service. Because a SIM is not set for the call service and the SMS, the Call and the SMS in the SIM setting database 830 may still be maintained in an initialized state.

A reference numeral 840 may indicate a SIM setting database in a case that a SIM for the mobile data service is changed to the SIM 1 whose phone number is "0987733", and a SIM for the SMS is changed to the SIM 2 whose phone number is "0987734". For example, the reference numeral 840 may indicate an updated SIM setting database in a case that SIMs for services are changed in the electronic device. In the SIM settings database 840, the Data for the SIM 1 may be set to "8/31/2021 16:15" which is a timestamp at which the SIM 1 is set for the mobile service, and the SMS for the SIM 2 may be set to "8/31/2021 16:15" which is a timestamp at which the SIM 2 is set for the SMS.

Referring back to FIG. 7, the processor may initialize the SIM setting database in operation 711, and initialization of the SIM setting database may be to store a timestamp of a subscriber (e.g., a SIM) assigned to each service. After initializing the SIM setting database, the processor may identify that a SIM change event occurs in operation 713. In an embodiment of the disclosure, by identifying that the SIM change event occurs, the processor may identify whether a SIM is successfully initialized as well as identifying that the SIM change event occurs.

In an embodiment of the disclosure, the SIM change event may occur if a SIM card is inserted into the electronic device or an eSIM profile is changed.

In an embodiment of the disclosure, the electronic device may support a pSIM and/or an eSIM, and a SIM initiation process of the pSIM and the eSIM may be similar or substantially the same. Upon detecting (or sensing) that a SIM tray is inserted, the electronic device may determine whether a SIM card is inserted. Alternatively, detecting (or sensing) that an eSIM is activated, the electronic device may determine whether an activated profile exists.

In an embodiment of the disclosure, upon detecting that the SIM card is inserted or detecting that the activated eSIM profile exists, the electronic device may perform a SIM initiation process. In an embodiment of the disclosure, the SIM initiation process may include an operation of loading an EF (e.g., at least one of $EF_{e\text{-}ICCID}$ or $EF_{ICCID}$, and $EF_{MSISDN}$ or $EF_{IMSI}$) and identifying an initial phonebook and/or a SIM application tool (AT).

If the SIM initiation process is successful, a state of the SIM card may be loaded. Based on the $EF_{e\text{-}ICCID}$ or $EF_{ICCID}$, the electronic device may have an (e)ICCID of all activated SIM cards. In an embodiment of the disclosure, the electronic device may obtain a subscriber's phone number through a UICC memory, such as $EF_{MSISDN}$ or another EF, or an external server of an operator or a $3^{rd}$ party provider, as well as the ICCID.

In an embodiment of the disclosure, if the SIM initiation process fails, the electronic device may identify that a SIM is not present (SIM absent) or that the SIM is an unknown SIM (SIM unknown).

An example of an operation in which an electronic device identifies that a SIM change event occurs according to an embodiment will be described with reference to FIG. 9.

Figure 9:
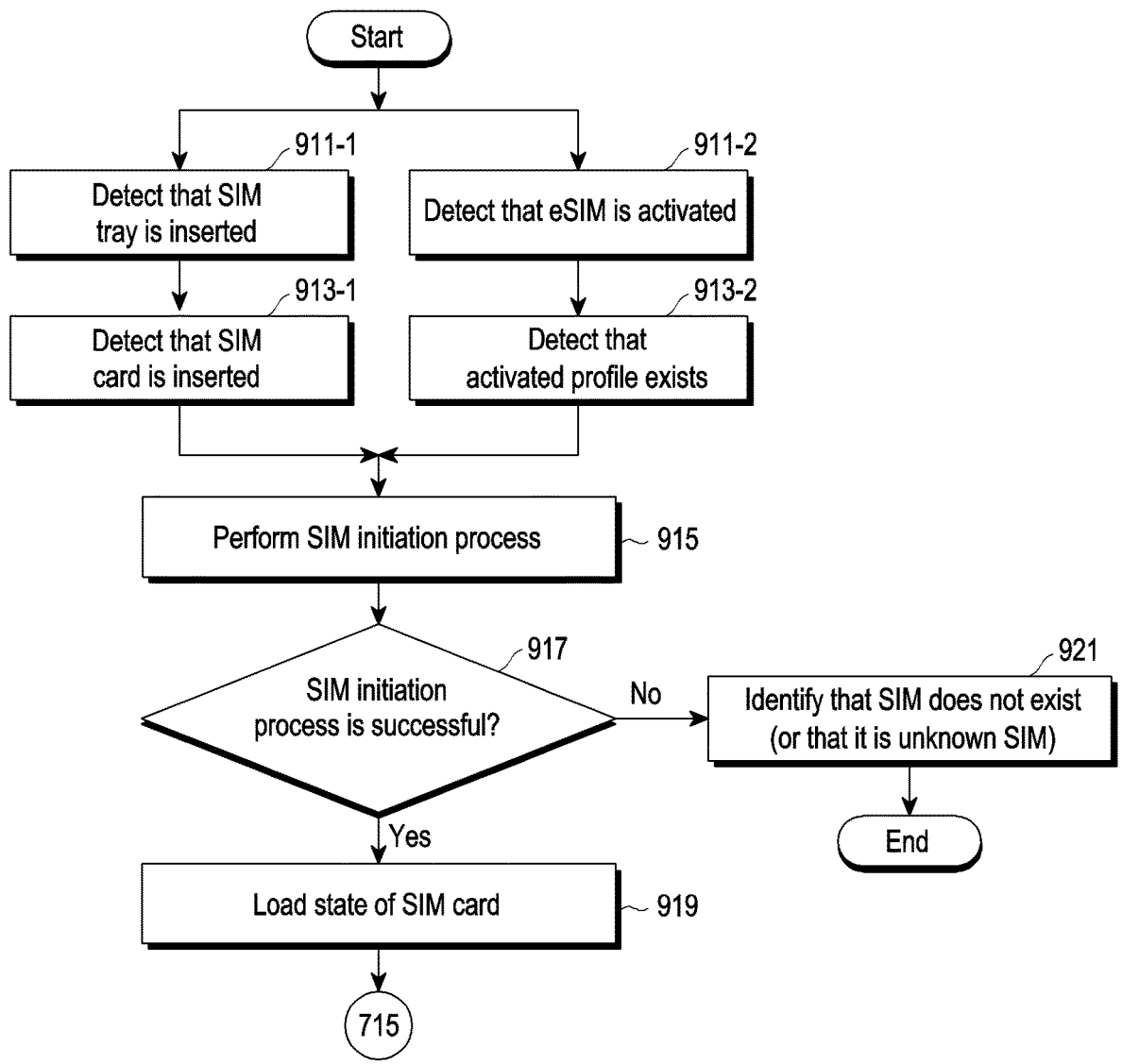
FIG. 9 is a flowchart illustrating an operation in which an electronic device identifies that a SIM change event occurs according to an embodiment of the disclosure.

FIG. 9 is a flowchart illustrating an operation in which an electronic device identifies that a SIM change event occurs according to an embodiment of the disclosure.

Referring to FIG. 9, an example in which an electronic device (e.g., an electronic device 101 in FIG. 1, 2, 3, 5A, 5B, or 5C) identifies whether a SIM change event occurs illustrated in FIG. 9 may correspond to an operation of identifying whether a SIM change event occurs in operation 713 in FIG. 7.

The electronic device may support a pSIM and/or an eSIM, and a SIM initialization process of the pSIM and the eSIM may be similar or substantially the same. Upon detecting (or sensing) that a SIM tray is inserted in operation 911-1, a processor (e.g., the processor 120 in FIG. 1, 3, 5A, 5B, or 5C) of the electronic device may determine whether a SIM card is inserted in an operation 913-1. Alternatively, upon detecting (or sensing) that an eSIM is activated in operation 911-2, the processor of the electronic device may determine whether an activated profile exists in operation 913-2. In FIG. 9, it will be assumed that the processor detects that the SIM card is inserted in operation 913-1. Alternatively, in FIG. 9, it will be assumed that the processor detects that the activated profile exists in operation 913-2.

In an embodiment of the disclosure, upon detecting that the SIM card is inserted or detecting that the activated eSIM profile exists, the processor may perform a SIM initiation process in operation 915. In an embodiment of the disclosure, the SIM initiation process may include an operation of loading an EF (e.g., at least one of $EF_{e\text{-}ICCID}$ or $EF_{ICCID}$, and $EF_{MSISDN}$ or $EF_{IMSI}$) and identifying an initial phone book and a SIM AT.

In operation 917, the processor may determine whether the SIM initiation process is successful. As a result of the determination, if the SIM initiation process is successful, the processor may load a state of the SIM card in operation 919. For example, based on the $EF_{e\text{-}ICCID}$ or $EF_{ICCID}$, the processor may have an (e)ICCID of all activated SIM cards. In an embodiment of the disclosure, the processor may obtain, as well as the ICCID, a subscriber's phone number through a UICC memory, such as an $EF_{MSISDN}$ or another EF, or an external server of an operator or a third party provider.

As a result of the determination in operation 917, if the SIM initiation process fails, in operation 921, the processor may identify that a SIM does not exist or that it is an unknown SIM. Upon identifying that the SIM does not exist, or identifying that it is unknown SIM, the processor may terminate without performing any further operations.

Referring back to FIG. 7, upon identifying that the SIM change event occurs, because the EF has already been loaded, the processor may store a phone number and/or an (e) ICCID of each of all SIM cards inserted into the electronic device or activated eSIM profiles. In operation 715, the processor may identify whether the (e)ICCIDs of all inserted SIM cards or all activated eSIM profiles are stored in the SIM setting database.

As a result of identifying in operation 715, if the (e)ICCIDs of all inserted SIM cards or all activated eSIM profiles are not stored in the SIM setting database, the processor may identify the phone numbers of all inserted SIM cards or all activated eSIM profiles are stored in the SIM setting database in operation 725. As a result of identifying in operation 725, if the phone numbers of all inserted SIM cards or all activated eSIM profiles are stored in the SIM setting database, the processor may update mapping relationship, stored in the SIM setting database, between the phone numbers of all inserted SIM cards or all activated eSIM profiles and the (e)ICCIDs of all inserted SIM cards or all activated eSIM profiles in operation 727. In an embodiment of the disclosure, if a pSIM card is changed or an eSIM is used in a new electronic device other than an existing electronic device, an (e) ICCID in the SIM setting database may be changed, but a phone number may not be changed. So, if a phone number of an inserted SIM card or an activated eSIM profile is stored in the SIM setting database, but an (e)ICCID corresponding to the stored phone number is not stored in the SIM setting database, the processor may update mapping relationship between the phone number of the inserted SIM card or the activated eSIM profile and the (e)ICCID of the inserted SIM card or the activated eSIM profile. In an embodiment of the disclosure, operations 715, 725, and 727 may be operations for selecting a subscriber (or a SIM) for each activated service based on the most recently assignment time.

As a result of identifying in operation 715, if the (e)ICCIDs of all inserted SIM cards or all activated eSIM profiles are stored in the SIM setting database, the processor may select a SIM for each service provided by the electronic device based on the latest assignment time (e.g., a latest timestamp) in operation 717. In an embodiment of the disclosure, the processor may select a SIM for each of the services based on assignment time of SIMs assigned for the services. In an embodiment of the disclosure, because a plurality of SIMs (e.g., a plurality of active SIMs) exist in the electronic device, the processor may select a SIM for each service provided by the electronic device based on latest assignment time in operation 717. In FIG. 7, a case in which the processor selects the SIM for each service based on the latest assignment time has been described as an example, but it may not necessarily be limited to the latest assignment time.

Upon selecting the SIM for each service provided by the electronic device based on the latest assignment time, the processor may identify whether a SIM is selected for all services provided by the electronic device in operation 719. As a result of identifying in operation 719, if the SIM is not selected for all services provided by the electronic device, the processor may identify that there is no history of providing a service in the electronic device for the corresponding service for which the SIM is not selected. So, the processor may obtain information (e.g., at least one of a registered promotion package, a radio access technology (RAT), and account information) which may be used for SIM selection in operation 729. For example, the account information may include account balance. In an embodiment of the disclosure, the information which may be used for the SIM selection may include various other information as well as the promotion package, the RAT, and/or the account balance.

Upon obtaining the information which may be used for the SIM selection, the processor may select a SIM for each service based on the information which may be used for the SIM selection, obtained in operation 731. In an embodiment of the disclosure, the processor may select the SIM for each service based on the at least one of the promotion package, the RAT, or the account balance based on a SIM setting rule, and this will be described as follows.

In an embodiment of the disclosure, the processor may select a SIM which satisfies at least one of the following conditions as the SIM for each service. In an embodiment of the disclosure, at least one of the following conditions 1 to 3 may be included in the SIM setting rule.

(1) Condition 1

A promotion package of a SIM may have a low cost quota for a service. For example, a SIM corresponding to a promotion package having the lowest cost for the service among promotion packages for a plurality of SIMs may be selected as a SIM for the service.

(2) Condition 2

Account balance of a SIM may be greater than that of other SIMs. For example, a SIM corresponding to account information having the largest account balance among account information for a plurality of SIMs may be selected as a SIM for a service.

(3) Condition 3

A version of an RAT of a SIM may be higher than versions of RATs of other SIMs. For example, a 5G RAT may be higher than a 4G RAT, and the 4G RAT may be higher than a 3G RAT. For example, a SIM with the highest version among RATs for a plurality of SIMs may be selected as a SIM for a service.

In an embodiment of the disclosure, the conditions 1 to 3 may be manually set by a user of the electronic device, stored in advance in the electronic device, or received through an external server of an operator or a third party provider.

Operations 717, 719, 729, and 731 may be operations for selecting a SIM for each service.

In this way, as SIMs are selected for all services, the processor may display recommended SIM setting information indicating selected SIMs for all services via a display module (e.g., the display module 160 in FIG. 1) in operation 721. For example, if the electronic device provides a phone service, an SMS, and a mobile data service, the processor may display, via the display module, recommended SIM setting information indicating a SIM selected for each of the phone service, the SMS, and the mobile data service. In an embodiment of the disclosure, the recommended SIM setting information may be displayed through a UI.

After displaying the recommended SIM setting information, the processor may detect that a signal indicating that the recommended SIM setting information will be used as SIM setting information is inputted via an input module (e.g., the input module 150 in FIG. 1 or 3) in operation 721. For example, the processor may detect that a signal indicating that the recommended SIM setting information will be used as the SIM setting information is inputted through a UI. Upon detecting that the signal indicating that the recommended SIM setting information will be used as the SIM setting information is inputted, the processor may update the SIM setting database based on the recommended SIM setting information in operation 723.

In an embodiment of the disclosure, the processor may detect that a confirmation signal indicating that the recommended SIM setting information will be accepted as it is (for example, the signal indicating that the recommended SIM setting information will be used as the SIM setting information) is inputted via the input module, and alternatively, may detect that a signal indicating that the recommended SIM setting information is not accepted and will be modified is inputted via the input module. FIG. 7 describes a case in which the processor detects that the confirmation signal indicating that the recommended SIM setting information will be accepted as it is detected via the input module.

For example, upon detecting that the signal indicating that the recommended SIM setting information will be used as the SIM setting information is inputted, the processor may update the SIM setting database in operation 723 as follows.

(1) If a new SIM card is inserted into the electronic device, the SIM setting database may be updated by generating a record for the new SIM card to store a timestamp for each service.

(2) If the new SIM card is not inserted into the electronic device, the SIM setting database may be updated by updating a timestamp for a corresponding service.

Operations 721 and 723 may be operations of user confirmation for the recommended SIM setting information and updating the SIM setting database.

Figure 10:
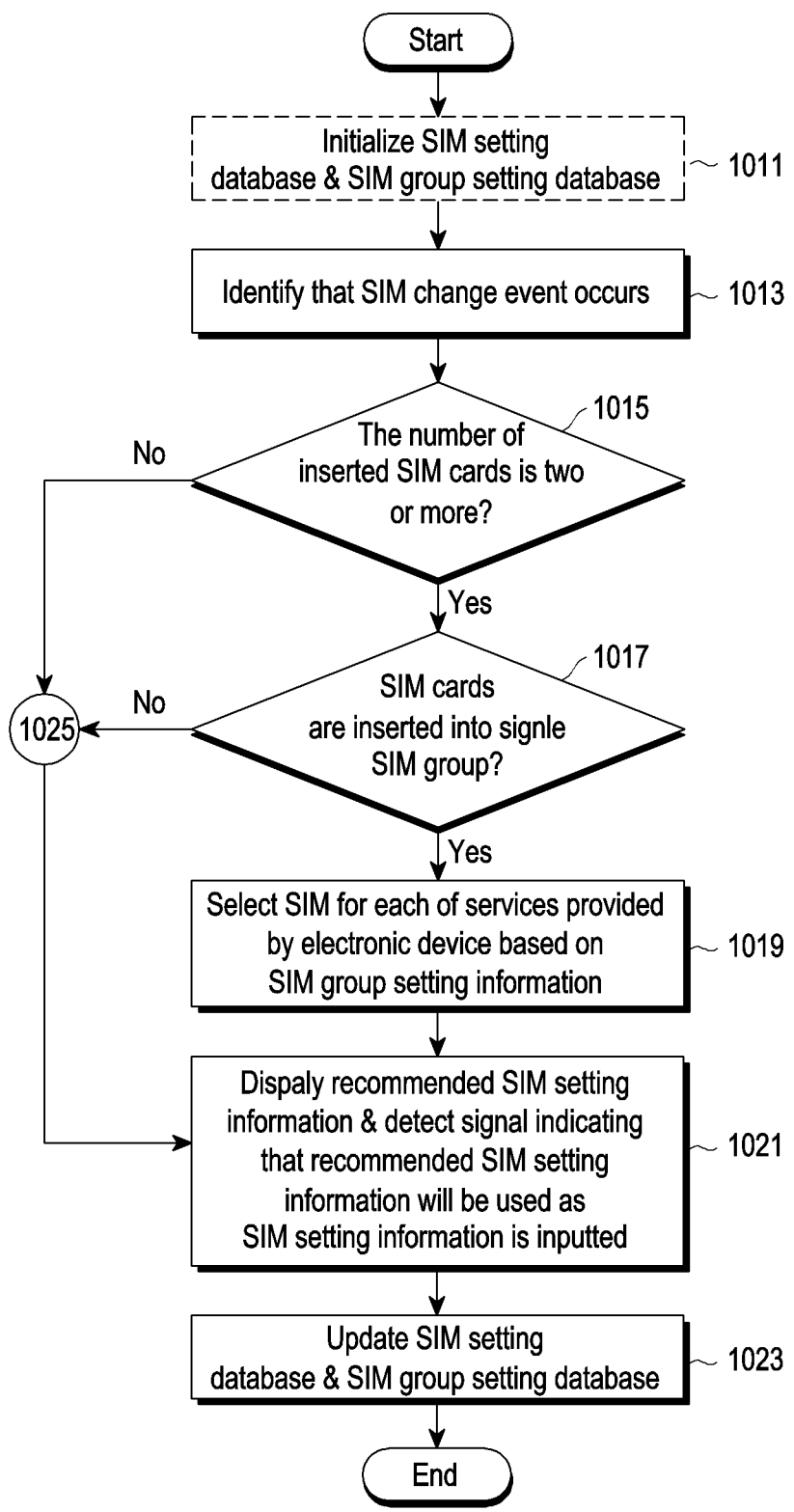
FIG. 10 is a flowchart illustrating an operating process of an electronic device according to an embodiment of the disclosure.

FIG. 10 is a flowchart illustrating an operating process of an electronic device according to an embodiment.

Referring to FIG. 10, a processor (e.g., the processor 120 in FIG. 1, 3, 5A, 5B, or 5C) of an electronic device (e.g., an electronic device 101 in FIG. 1, 3, 5A, 5B, or 5C) may initialize a SIM setting history database (or a subscriber setting history database) and a SIM group setting history database (or a subscriber group setting history database) in operation 1011.

In an embodiment of the disclosure, the SIM setting database and the SIM group setting database may be initialized if the electronic device is first booted or if the electronic device starts operating after being factory reset. So, operation 1011 may not be performed every time, but may be performed only once if the electronic device is first booted or if the electronic device starts operating after being factory reset. In an embodiment of the disclosure, the SIM setting database and the SIM group setting database may be stored in a memory (e.g., a memory 130 in FIG. 1, 3, 5A, 5B, or 5C) of the electronic device.

In an embodiment of the disclosure, the SIM setting database may include at least one of subscriber information (e.g., a phone number) related to each subscriber, SIM card information (e.g., an (e)ICCID)) of each subscriber, or a timestamp when each subscriber is provided with a service. In an embodiment of the disclosure, subscriber information and SIM card information may be included in information related to a SIM (e.g., SIM-related information). In an embodiment of the disclosure, assigning a subscriber to a service may mean assigning a SIM to a service. An updating operation for the SIM setting database may be implemented similarly or substantially the same as an updating operation for a SIM setting database described in FIG. 7 or 8, so a detailed description thereof will be omitted.

In an embodiment of the disclosure, the SIM group setting database may include a SIM group ID, and/or for each SIM group, SIM information (e.g., a phone number) and SIM card information (e.g., an (e)ICCID) for a call service, SIM information (e.g., a phone number) and SIM card information (e.g., an (e)ICCID) for an SMS, and SIM information (e.g., a phone number) and SIM card information (e.g., an (e)ICCID) for a mobile data service.

An example of an operation in which an electronic device initializes or updates a SIM group setting history database according to an embodiment will be described with reference to FIG. 11.

FIG. 11 is a diagram illustrating an operation in which an electronic device initializes or updates a SIM group setting database according to an embodiment of the disclosure.

Referring to FIG. 11, a reference numeral 1110 may indicate a structure of a SIM group setting database in a case that an electronic device initializes the SIM group setting database. As described in operation 1011 in FIG. 10, the SIM group setting database may be initialized if the electronic device is first booted or if the electronic device starts operating after being factory reset. In the initialized SIM group setting database 1110, a SIM group ID, and/or for each SIM group, SIM information (e.g., a phone number) and SIM card information (e.g., an (e)ICCID) for a call service, SIM information (e.g., a phone number) and SIM card information (e.g., an (e)ICCID) for an SMS, and SIM information (e.g., a phone number) and SIM card information (e.g., an (e)ICCID) for a mobile data service may be initialized to "none".

In an embodiment of the disclosure, Call may indicate SIM information and SIM card information for a call service for a SIM group corresponding to a corresponding SIM group ID, SMS may indicate SIM information and SIM card information for an SMS for the SIM group corresponding to the corresponding SIM group ID, and Data may indicate SIM information and SIM card information for a mobile data service for the SIM group corresponding to the corresponding SIM group ID.

A reference numeral 1120 may indicate a SIM group database in a case that a SIM (e.g., a SIM 1) with a phone number "phone_no_1", a SIM (e.g., a SIM 2) with a phone number "phone_no_2", a SIM (e.g., a SIM 3) with a phone number "phone_no_3", a SIM (e.g., a SIM 4) with a phone number "phone_no_4", and a SIM (e.g., a SIM 5) with a phone number "phone_no_5" are inserted to the electronic device, the SIM 1, the SIM 4, and the SIM 5 are included in a SIM group whose SIM group ID is "SIM 145", the SIM 2 and the SIM 5 are included in a SIM group whose SIM group ID is "SIM 25", and the SIM 1, the SIM 2, and the SIM 3 are included in a SIM group whose SIM group ID is "SIM 123". For example, an ICCID of the SIM 1 is Iccid_1, an ICCID of the SIM 2 is Iccid_2, an ICCID of the SIM 3 is Iccid_3, an ICCID of the SIM 4 is Iccid_4, and an ICCID of SIM 5 is Iccid_5.

According to an embodiment of the disclosure, in the SIM group setting database 1120, for the SIM group SIM 145, SIM information and SIM card information for a call service may be Iccid_1 and phone_no_1, respectively, SIM information and SIM card information for an SMS may be Iccid_4 and phone_no_4, respectively, and SIM information and SIM card information for a mobile data service may be Iccid_5 and phone_no_5, respectively. In an embodiment of the disclosure, in a case of the SIM group SIM 145, the call service may be provided through the SIM 1 whose SIM information and SIM card information are Iccid_1 and phone_no_1, respectively, the SMS may be provided through the SIM 4 whose SIM information and SIM card information are Iccid_4 and phone_no_4, respectively, and the mobile data service may be provided through the SIM 5 whose SIM information and SIM card information are Iccid_5 and phone_no_5, respectively.

According to an embodiment of the disclosure, in the SIM group setting database 1120, for the SIM group SIM 25, SIM information and SIM card information for a call service may be Iccid_2 and phone_no_2, respectively, SIM information and SIM card information for an SMS may be Iccid_2 and phone_no_2, respectively, and SIM information and SIM card information for a mobile data service may be Iccid_5 and phone_no_5, respectively. In an embodiment of the disclosure, in a case of the SIM group SIM 25, the call service and the SMS may be provided through the SIM 2 whose SIM information and SIM card information are Iccid_2 and phone_no_2, respectively, and the mobile data service may be provided through the SIM 5 whose SIM information and SIM card information are Iccid_5 and phone_no_5, respectively.

According to an embodiment of the disclosure, in the SIM group setting database 1120, for the SIM group SIM 123, SIM information and SIM card information for a call service may be Iccid_1 and phone_no_1, respectively, SIM information and SIM card information for an SMS may be Iccid_2 and phone_no_2, respectively, and SIM information and SIM card information for a mobile data service may be Iccid_3 and phone_no_3, respectively. In an embodiment of the disclosure, in a case of the SIM group SIM 123, the call service may be provided through the SIM 1 whose SIM information and SIM card information are Iccid_1 and phone_no_1, respectively, the SMS may be provided through the SIM 2 whose SIM information and SIM card information are Iccid_2 and phone_no_2, respectively, and the mobile data service may be provided through the SIM 3 whose SIM information and SIM card information are Iccid_3 and phone_no_3, respectively.

Referring back to FIG. 10, an operation of initializing or updating the SIM setting database may be implemented similarly to or substantially the same as an operation of initializing or updating a SIM setting database described in FIG. 8, so a detailed description thereof will be omitted. Upon initializing the SIM setting database and the SIM group setting database, the processor may identify that a SIM change event occurs in operation 1013. In an embodiment of the disclosure, by identifying that the SIM change event occurs, the processor may identify whether a SIM is successfully initialized as well as identifying that the SIM change event occurs.

In an embodiment of the disclosure, the SIM change event may occur if a SIM card is inserted into the electronic device or an eSIM profile is changed.

In an embodiment of the disclosure, the electronic device may support a pSIM and/or an eSIM, and a SIM initiation process of the pSIM and the eSIM may be similar or substantially the same. Upon detecting (or sensing) that a SIM tray is inserted, the electronic device may determine whether a SIM card is inserted. Alternatively, detecting (or sensing) that an eSIM is activated, the electronic device may determine whether an activated profile exists.

In an embodiment of the disclosure, upon detecting that the SIM card is inserted or detecting that the activated eSIM profile exists, the electronic device may perform a SIM initiation process. In an embodiment of the disclosure, the SIM initiation process may include an operation of loading an EF (e.g., at least one of $EF_{e\text{-}ICCID}$ or $EF_{ICCID}$, and $EF_{MSISDN}$ or $EF_{IMSI}$) and identifying an initial phonebook and a SIM AT.

If the SIM initiation process is successful, a state of the SIM card may be loaded. Based on the $EF_{e\text{-}ICCID}$ or $EF_{ICCID}$, the electronic device may have an (e)ICCID of all activated SIM cards. In an embodiment of the disclosure, the electronic device may obtain a phone number of a subscriber (or a SIM) through a UICC memory, such as $EF_{MSISDN}$ or another EF, or an external server of an operator or a $3^{rd}$ party provider, as well as the ICCID.

In an embodiment of the disclosure, if the SIM initiation process fails, the electronic device may identify that a SIM is not present (SIM absent) or that the SIM is an unknown SIM (SIM unknown).

In an embodiment of the disclosure, the operation of identifying that the SIM change event occurs in operation 1013 may be implemented similarly to or substantially the same as an operation of identifying that a SIM change event occurs in operation 713 in FIG. 7 or an operation of identifying that a SIM change event occurs in FIG. 9, so a detailed description thereof will be omitted.

Upon identifying that the SIM change event occurs, because the EF has already been loaded, the processor may store a phone number and/or an (e) ICCID of each of all SIM cards inserted into the electronic device or activated eSIM profiles. In operation 1015, the processor may identify whether a plurality of SIM cards are inserted into the electronic device. For example, in operation 1015, the processor may identify whether the number of SIM cards inserted into the electronic device is greater than or equal to 2.

As a result of identifying in operation 1015, if the number of SIM cards inserted into the electronic device is not greater than or equal to 2, for example, if the number of SIM cards inserted into the electronic device is 1, the processor may perform operation 1025. For example, if the number of SIM cards inserted into the electronic device is 1, it may mean that the SIM group setting database is not actually used, although the SIM group setting database is stored in the electronic device. In an embodiment of the disclosure, an operation in a case that the SIM group setting database is not used may be implemented similarly to or substantially the same as an operation described in FIG. 7. For example, operation 1025 may be implemented in a form including operations 715, 717, 719, 725, 727, 729, and 731 described in FIG. 7, so a detailed description thereof will be omitted.

As the result of identifying in operation 1015, if the number of SIM cards inserted into the electronic device is greater than or equal to 2, the processor may identify whether the SIM cards inserted into the electronic device are included in a single SIM group in operation 1017. As a result of identifying in operation 1017, if the SIM cards inserted into the electronic device are not included in the single SIM group, the processor may perform operation 1025. In an embodiment of the disclosure, if the SIM cards inserted into the electronic device are not included in the single SIM group, the processor may generate a new SIM group for the inserted SIM cards and store the new SIM group in the SIM group setting database. An operation of initializing or updating the SIM group setting database may be implemented similarly to or substantially the same as an operation of initializing or updating a SIM group setting database described in FIG. 11, so a detailed description thereof will be omitted.

As the result of identifying in operation 1017, if the SIM cards inserted into the electronic device are included in the single SIM group, the processor may select a SIM for each of services provided by the electronic device based on SIM group setting information stored in the SIM group setting database in operation 1019. For example, if the SIM cards inserted into the electronic device belong to SIM group 145 stored in the SIM group setting database as described in FIG. 11 (for example, if the SIM cards inserted into the electronic device are a SIM 1, a SIM 4, and a SIM 5, and the SIM 1, the SIM 4, and the SIM 5 belong to the SIM group 145), the processor may assign the SIM 1 whose phone number is "phone_no_1" and ICCID is "Iccid_1" to a call service provided by the electronic device, assign the SIM 4 whose phone number is "phone_no_4" and ICCID is "Iccid_4" to an SMS provided by the electronic device, and assign the SIM 5 whose phone number is "phone_no_5" and ICCID is "Iccid_5" to a mobile data service provided by the electronic device.

Upon selecting a SIM for each of services provided by the electronic device based on the SIM group setting information stored in the SIM group setting database, the processor may display recommended SIM setting information indicating a selected SIM for each of the services provided by the electronic device via a display module (e.g., the display module 160 in FIG. 1 or 3) in operation 1021. For example, if the electronic device provides a phone service, an SMS, and a mobile data service, the processor may display, via the display module, recommended SIM setting information indicating a SIM selected for each of the phone service, the SMS, and the mobile data service. In an embodiment of the disclosure, the recommended SIM setting information may be outputted through a UI.

After displaying the recommended SIM setting information, the processor may detect that a signal indicating that the recommended SIM setting information will be used as SIM setting information is inputted via an input module (e.g., the input module 150 in FIG. 1 or 3) in operation 1021. For example, the processor may detect that a signal indicating that the recommended SIM setting information will be used as the SIM setting information is inputted through a UI. Upon detecting that the signal indicating that the recommended SIM setting information will be used as the SIM setting information is inputted, the processor may update the SIM setting database and/or the SIM group setting database based on the recommended SIM setting information in operation 1023.

In an embodiment of the disclosure, the processor may detect that a confirmation signal indicating that the recommended SIM setting information will be accepted as it is (for example, the signal indicating that the recommended SIM setting information will be used as the SIM setting information) is inputted via the input module, and alternatively, may detect that a signal indicating that the recommended SIM setting information is not accepted and will be modified is inputted via the input module. FIG. 10 describes a case in which the processor detects that the confirmation signal indicating that the recommended SIM setting information will be accepted as it is detected via the input module.

For example, upon detecting that the signal indicating that the recommended SIM setting information will be used as the SIM setting information is inputted, the processor may update the SIM setting database in operation 1023 as follows.

(1) If a new SIM card is inserted into the electronic device, the SIM setting database may be updated by generating a record for the new SIM card to store a timestamp for each service.

(2) If the new SIM card is not inserted into the electronic device, the SIM setting database may be updated by updating a timestamp for a corresponding service.

Operations 1021 and 1023 may be operations of user confirmation for the recommended SIM setting information and updating the SIM group setting database and the SIM setting database.

Figure 12:
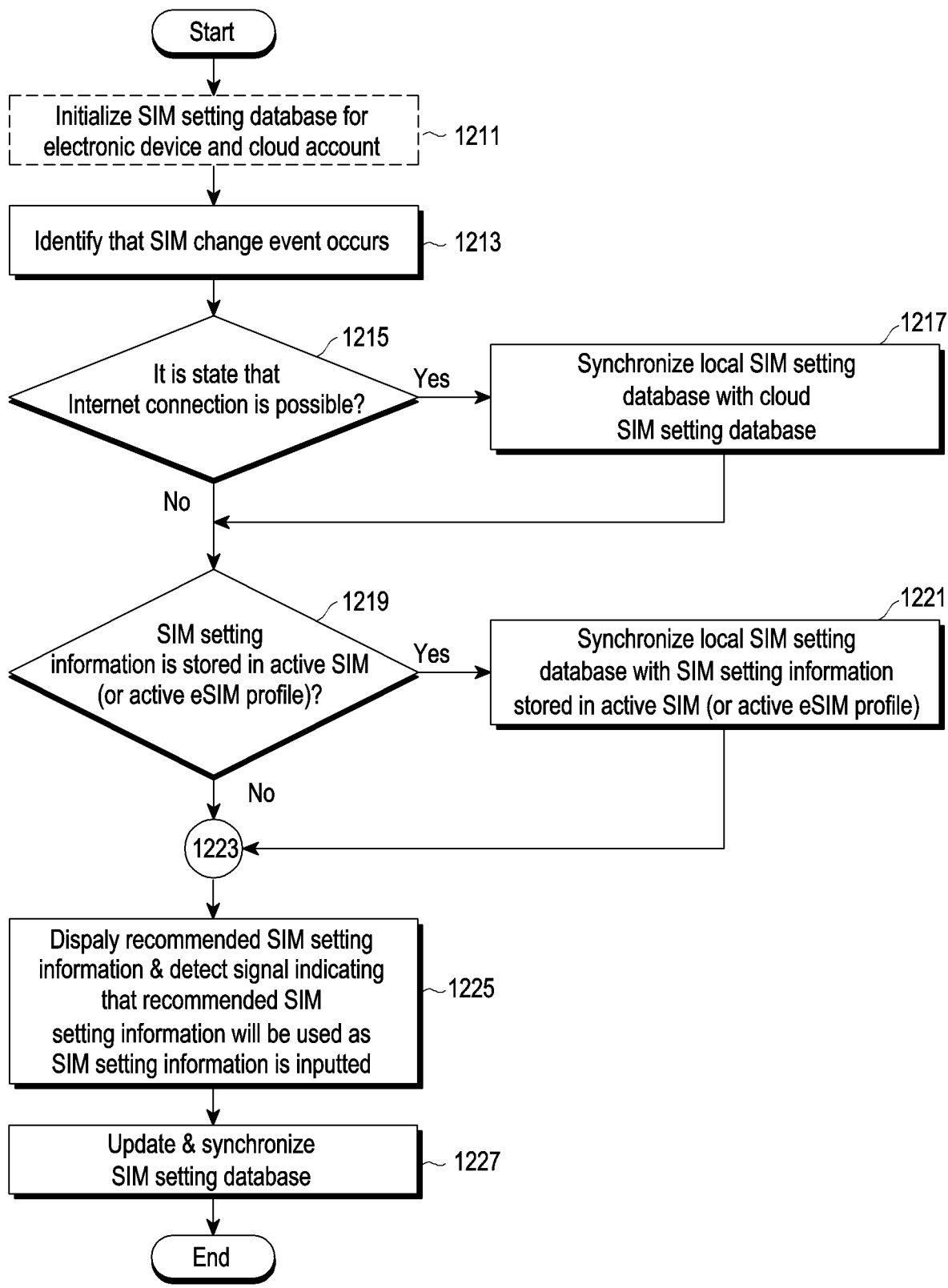
FIG. 12 is a flowchart illustrating an operating process of an electronic device according to an embodiment of the disclosure.

FIG. 12 is a flowchart illustrating an operating process of an electronic device according to an embodiment of the disclosure.

Referring to FIG. 12, a processor (e.g., a processor 120 in FIG. 1, 3, 5A, 5B, or 5C) of an electronic device (e.g., an electronic device 101 in FIG. 1, 3, 5A, 5B, or 5C) may initialize a SIM setting database for the electronic device and a SIM setting database for a cloud account. In an embodiment of the disclosure, the SIM setting database for the electronic device and the SIM setting database for the cloud account may be initialized if a SIM is changed to be used in the electronic device other than another electronic device (e.g., an existing electronic device), the electronic device is factory reset, or it is necessary to synchronize SIM setting databases for a plurality of electronic devices. So, operation 1211 may not be performed every time, but may be performed only once if the SIM is changed to be used in the electronic device other than the other electronic device (e.g., the existing electronic device), the electronic device is factory reset, or it is necessary to synchronize the SIM setting databases for the plurality of electronic devices.

In an embodiment of the disclosure, the SIM setting database for the electronic device may include at least one of subscriber information (e.g., a phone number) related to each subscriber, SIM card information (e.g., an (e)ICCID)) of each subscriber, or a timestamp when each subscriber is provided with a service. In an embodiment of the disclosure, subscriber information and SIM card information may be included in information related to a SIM (e.g., SIM-related information). In an embodiment of the disclosure, assigning a subscriber to a service may mean assigning a SIM to a service. An updating operation for the SIM setting database may be implemented similarly or substantially the same as an updating operation for a SIM setting database described in FIG. 7 or 8, so a detailed description thereof will be omitted.

Upon initializing the SIM setting database for the electronic device and the SIM group setting database for the cloud account, the processor may identify that a SIM change event occurs in operation 1213. In an embodiment of the disclosure, by identifying that the SIM change event occurs, the processor may identify whether a SIM is successfully initialized as well as identifying that the SIM change event occurs.

In an embodiment of the disclosure, the SIM change event may occur if a SIM card is inserted into the electronic device or an eSIM profile is changed.

In an embodiment of the disclosure, the electronic device may support a pSIM and/or an eSIM, and a SIM initiation process of the pSIM and the eSIM may be similar or substantially the same. Upon detecting (or sensing) that a SIM tray is inserted, the electronic device may determine whether a SIM card is inserted. Alternatively, detecting (or sensing) that an eSIM is activated, the electronic device may determine whether an activated profile exists.

In an embodiment of the disclosure, upon detecting that the SIM card is inserted or detecting that the activated eSIM profile exists, the electronic device may perform a SIM initiation process. In an embodiment of the disclosure, the SIM initiation process may include an operation of loading an EF (e.g., at least one of $EF_{e\text{-}ICCID}$ or $EF_{ICCID}$, and $EF_{MSISDN}$ or $EF_{IMSI}$) and identifying an initial phonebook and a SIM AT.

If the SIM initiation process is successful, a state of the SIM card may be loaded. Based on the $EF_{e\text{-}ICCID}$ or $EF_{ICCID}$, the electronic device may have an (e)ICCID of all activated SIM cards. In an embodiment of the disclosure, the electronic device may obtain a phone number of a subscriber (or a SIM) through a UICC memory, such as $EF_{MSISDN}$ or another EF, or an external server of an operator or a $3^{rd}$ party provider, as well as the ICCID.

In an embodiment of the disclosure, if the SIM initiation process fails, the electronic device may identify that a SIM is not present (SIM absent) or that the SIM is an unknown SIM (SIM unknown).

In an embodiment of the disclosure, the operation of identifying that the SIM change event occurs in operation 1213 may be implemented similarly to or substantially the same as an operation of identifying that a SIM change event occurs in operation 713 in FIG. 7 or an operation of identifying that a SIM change event occurs in FIG. 9, so a detailed description thereof will be omitted.

Upon identifying that the SIM change event occurs, because the EF has already been loaded, the processor may store a phone number and/or an (e) ICCID of each of all SIM cards inserted into the electronic device or activated eSIM profiles. In operation 1215, the processor may identify whether a state of the electronic device is a state in which an Internet connection is possible. As a result of identifying, if the state of the electronic device is the state in which the Internet connection is possible, the processor may synchronize a SIM setting database stored in a memory (e.g., a memory 130 in FIG. 1, 5A, 5B, or 5C) with a SIM setting database stored in an external electronic device (e.g., the server 108 in FIG. 1) in operation 1217. In an embodiment of the disclosure, the external electronic device may be a cloud server or a cloud server corresponding to a cloud account. For convenience of a description, the SIM setting database stored in the memory of the electronic device may also be referred to as a "local SIM setting database", and the SIM setting database stored in the cloud server may also be referred to as a "cloud SIM setting database". As the result of identifying in operation 1215, if the state of the electronic device is not the state in which the Internet connection is possible, the processor may identify whether SIM setting information is stored in an active SIM or an active eSIM profile in operation 1219.

In an embodiment of the disclosure, SIM setting information stored in the active SIM may be shown in Table 1 below. In an embodiment of the disclosure, the SIM setting information stored in the active SIM may be stored as an EF.

TABLE 1

| Timestamp | Call | Sms | Data |
|---|---|---|---|
| 7/7/2021 16:32 | 1 | 1 | 0 |

As shown in Table 1, it may be seen that a timestamp for a call service and an SMS is set to "7/7/2021 16:32". For example, in Table 1, "1" may indicate that an active SIM is set for a corresponding service, and "0" may indicate that an active SIM is not set for the corresponding service.

As a result of identifying in operation 1219, if the SIM setting information is stored in the active SIM or the active eSIM profile, the processor may synchronize the local SIM setting database with the SIM setting information stored in the active SIM or the active eSIM profile in operation 1221. In FIG. 12, it will be assumed that the SIM setting information stored in the active SIM or the active eSIM profile is newer than SIM setting information stored in the local SIM setting database. If the SIM setting information stored in the active SIM or the active eSIM profile is not newer than the SIM setting information stored in the local SIM setting database, the processor may not perform operation 1221. For example, if the SIM setting information stored in the active SIM or the active eSIM profile is not newer than the SIM setting information stored in the local SIM setting database, it may mean that the processor does not need to synchronize the SIM setting information stored in the active SIM or the active eSIM profile with the local SIM setting database.

As the result of identifying in operation 1219, if the SIM setting information is not stored in the active SIM or the active eSIM profile, the processor may perform operation 1223. For example, operation 1223 may be implemented in a form including operations 715, 717, 719, 725, 727, 729, and 731 described in FIG. 7, so a detailed description thereof will be omitted. Operation 1223 may be an operation of assigning a SIM which is most recently set (e.g., which has the most recent timestamp) for each of the services provided by the electronic device as a SIM for each of the services.

Upon selecting a SIM for each of services provided by the electronic device, the processor may display recommended SIM setting information indicating a selected SIM for each of the services provided by the electronic device via a display module (e.g., the display module 160 in FIG. 1 or 3) in operation 1225. For example, if the electronic device provides a phone service, an SMS, and a mobile data service, the processor may display, via the display module, recommended SIM setting information indicating a SIM selected for each of the phone service, the SMS, and the mobile data service. In an embodiment of the disclosure, the recommended SIM setting information may be outputted through a UI.

After displaying the recommended SIM setting information, the processor may detect that a signal indicating that the recommended SIM setting information will be used as SIM setting information is inputted via an input module (e.g., the input module 150 in FIG. 1 or 3) in operation 1225. For example, the processor may detect that a signal indicating that the recommended SIM setting information will be used as the SIM setting information is inputted through a UI. Upon detecting that the signal indicating that the recommended SIM setting information will be used as the SIM setting information is inputted, the processor may update the SIM setting database and/or the SIM group setting database based on the recommended SIM setting information in operation 1227.

In an embodiment of the disclosure, the processor may detect that a confirmation signal indicating that the recommended SIM setting information will be accepted as it is (for example, the signal indicating that the recommended SIM setting information will be used as the SIM setting information) is inputted via the input module, and alternatively, may detect that a signal indicating that the recommended SIM setting information is not accepted and will be modified is inputted via the input module. FIG. 12 describes a case in which the processor detects that the confirmation signal indicating that the recommended SIM setting information will be accepted as it is detected via the input module.

For example, upon detecting that the signal indicating that the recommended SIM setting information will be used as the SIM setting information is inputted, the processor may update the SIM setting database, and synchronize the updated SIM setting database (e.g., the updated local SIM setting database) with the cloud SIM setting database stored in the cloud server and the SIM setting information stored in the active SIM in operation 1227.

In an embodiment of the disclosure, the processor may detect that a confirmation signal indicating that the recommended SIM setting information will be accepted as it is (for example, the signal indicating that the recommended SIM setting information will be used as the SIM setting information) is inputted via the input module, and alternatively, may detect that a signal indicating that the recommended SIM setting information is not accepted and will be modified is inputted via the input module. FIG. 12 describes a case in which the processor detects that the confirmation signal indicating that the recommended SIM setting information will be accepted as it is detected via the input module.

For example, upon detecting that the signal indicating that the recommended SIM setting information will be used as the SIM setting information is inputted, the processor may update the SIM setting database in operation 1227 as follows.
  (1) If a new SIM card is inserted into the electronic device, the SIM setting database may be updated by generating a record for the new SIM card to store a timestamp for each service.
  (2) If the new SIM card is not inserted into the electronic device, the SIM setting database may be updated by updating a timestamp for a corresponding service.

Operations 1225 and 1227 may be operations of user confirmation for the recommended SIM setting information and updating and synchronizing the SIM setting information stored in the local SIM setting database, the cloud SIM setting database, and the active SIM.

Figure 13:
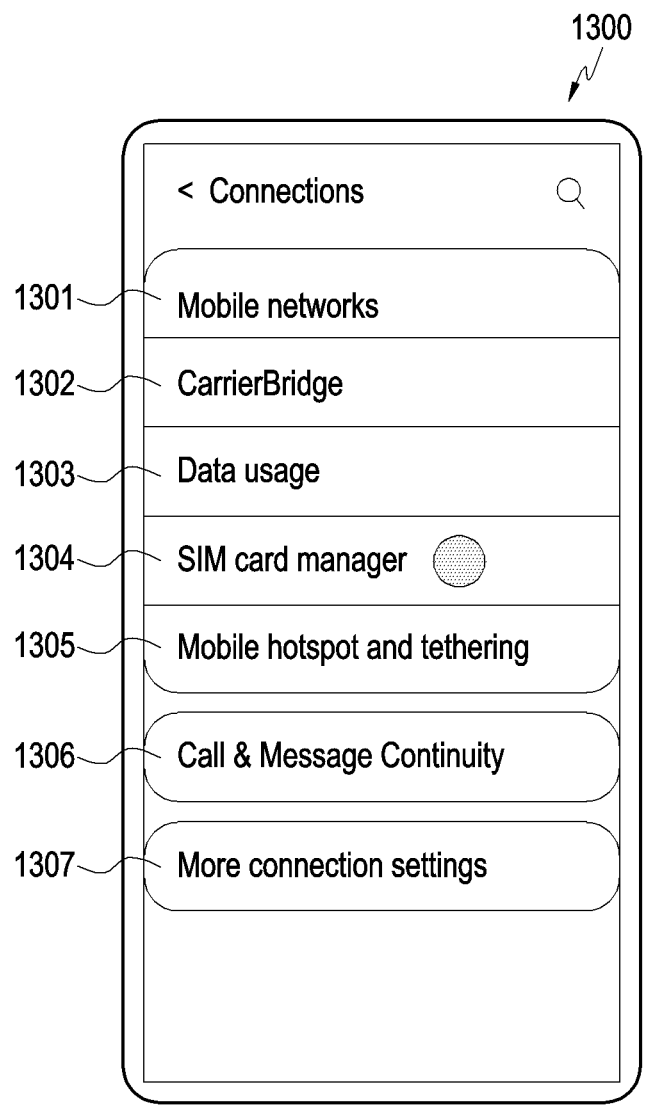
FIG. 13 is a diagram illustrating a screen displayed on an electronic device according to an embodiment of the disclosure.

FIG. 13 is a diagram illustrating a screen displayed on an electronic device according to an embodiment of the disclosure.

Referring to FIG. 13, an electronic device (e.g., an electronic device 101 in FIG. 1, 2, 3, 5A, 5B, or 5C) may display a screen 1300 which may establish a connection of a wireless communication network. For example, the screen 1300 which may establish the connection may include at least one of a networks (mobile networks) setting tab 1301, a carrier-bridge (carrieBridge) setting tab 1302, a data usage determination tab 1303, a SIM card manager setting tab 1304, a mobile hotspot and tethering setting tab 1305, a call and message continuity (a call & message continuity) setting tab 1306, or a more connection setting tab 1307. In an embodiment of the disclosure, there is no limitation to the number and types of tabs included in the screen 1300 which may establish the connection.

If the SIM card manager setting tab 1304 is selected from among the mobile networks setting tab 1301, the carrier-bridge setting tab 1302, the data usage determination tab 1303, the SIM card manager setting tab 1304, the mobile hotspot and tethering setting tab 1305, the call and message continuity setting tab 1306, or the more connection setting tab 1307, the electronic device may display a screen including information related to a SIM, and this will be described with reference to FIG. 14 as follows.

Figure 14:
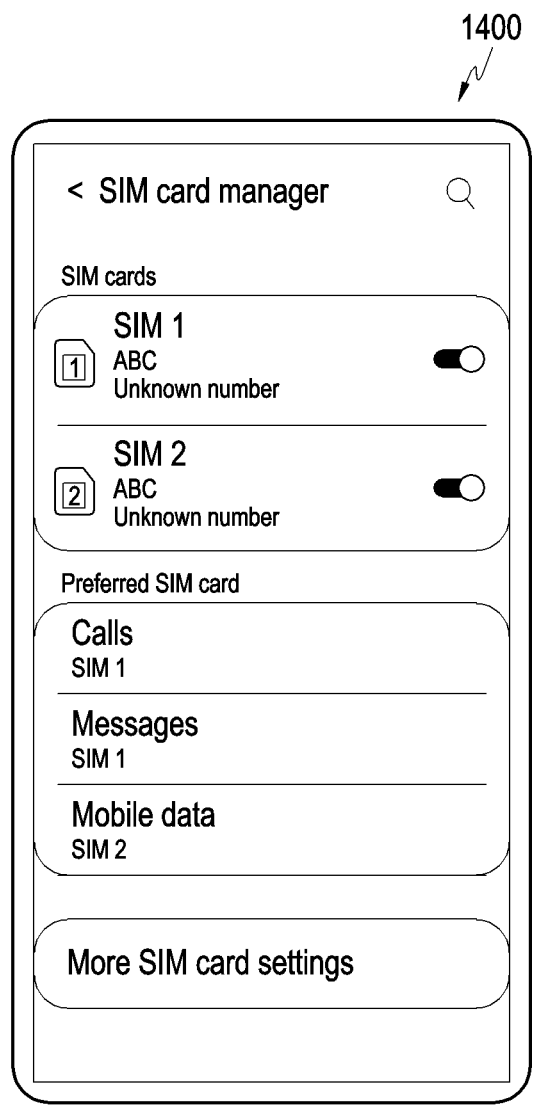
FIG. 14 is a diagram illustrating a screen displayed on an electronic device according to an embodiment of the disclosure.

FIG. 14 is a diagram illustrating a screen displayed on an electronic device according to an embodiment of the disclosure.

Referring to FIG. 14, an electronic device (e.g., an electronic device 101 in FIG. 1, 2, 3, 5A, 5B, or 5C) may display a screen 1400 including information related to a SIM if a SIM card manager setting tab 1304 is selected from among a mobile networks setting tab 1301, a carrier-bridge setting tab 1302, a data usage determination tab 1303, a SIM card manager setting tab 1304, a mobile hotspot and tethering setting tab 1305, a call and message continuity setting tab 1306, or a more connection setting tab 1307 as described in FIG. 13.

The screen 1400 including the information related to the SIM may include tabs which correspond to a plurality of SIMs. For example, if two SIMs (e.g., a SIM 1 and a SIM 2) are inserted into the electronic device, the screen 1400 including the information related to the SIM may include a tab 1410 which corresponds to the SIM 1 and a tab 1420 which corresponds to the SIM 2. The electronic device may display information related to the SIM 1 on the tab 1410 which corresponds to the SIM 1, and may display information related to the SIM 2 on the tab 1420 which corresponds to the SIM 2.

The screen 1400 including the information related to the SIM may include a call service (calls)-related tab 1430, a messages-related tab 1440, and/or a mobile data-related tab 1450 depending on the implementation. In an embodiment of the disclosure, the messages-related tab 1440 may be an SMS-related tab. There is no limitation on the number and types of taps included in the screen 1400 including the information related to the SIM.

In FIG. 14, it may be recommended that the electronic device assigns the SIM 1 for the call service, assigns the SIM 1 for the SMS, and assigns the SIM 2 for the mobile data service. For example, "SIM 1" is marked in the call service-related tab 1430, "SIM 2" is marked in the messages-related tab 1440, and "SIM 2" is marked in the mobile data-related tab 1450, so a user of the electronic device may recognize that the electronic device recommends assigning the SIM 1 for the call service, assigning the SIM 1 for the SMS, and assigning the SIM 2 for the mobile data service.

According to an embodiment of the disclosure, an operating method of an electronic device (e.g., an electronic device 101 in FIG. 1, 3, or 6) may comprise, based on a subscriber identity module (SIM) change event, in which at least one SIM is inserted, occurring, identifying whether SIM-related information related to the at least one SIM exists in a database which includes SIM setting information for services provided by the electronic device (e.g., the electronic device 101 in FIG. 1, 3, or 6).

According to an embodiment of the disclosure, the operating method may further comprise, in case of being identified that the SIM-related information exists in the database, selecting a SIM for each of the services based on the SIM setting information.

According to an embodiment of the disclosure, selecting the SIM for each of the services based on the SIM setting information may comprise, based on assignment time of SIMs assigned for the services included in the SIM setting information, selecting one of a plurality of SIMs including the at least one SIM as a SIM for one of the services.

According to an embodiment of the disclosure, selecting the SIM for each of the services based on the SIM setting information may comprise, based on most recent assignment time among the assignment time of the SIMs assigned for the services, selecting the one of the plurality of SIMs as the SIM of the one of the services.

According to an embodiment of the disclosure, selecting the SIM for each of the services based on the SIM setting information may comprise identifying whether at least one service, for which a SIM is not selected among the services, exists.

According to an embodiment of the disclosure, selecting the SIM for each of the services based on the SIM setting information may further comprise, in case of being identified that the at least one service exists, selecting one of a plurality of SIMs including the at least one SIM as a SIM for the at least one service, based on at least one of a promotion package, a radio access technology (RAT), or account information for each of the plurality of SIMs.

According to an embodiment of the disclosure, selecting the one of the plurality of SIMs as the SIM for the at least one service may comprise selecting a SIM which corresponds to a promotion package having lowest cost for the at least one service from among promotion packages for the plurality of SIMs as the SIM for the at least one service, select a SIM of a latest version from among versions of RATs for the plurality of SIMs as the SIM for the at least one service, or select a SIM which corresponds to account information having largest account balance from among account information for the plurality of SIMs as the SIM for the at least one service.

According to an embodiment of the disclosure, the operating method may further comprise displaying recommended SIM setting information indicating a SIM selected for each of the services.

According to an embodiment of the disclosure, the operating method may further comprise detecting that a signal indicating that the recommended SIM setting information is to be used as the SIM setting information is inputted.

According to an embodiment of the disclosure, the operating method may further comprise updating the SIM setting information based on the recommended SIM setting information.

According to an embodiment of the disclosure, the operating method may further comprise, in case of being identified that the SIM-related information does not exist in the database, identify whether at least one service, for which a SIM is not selected among the services, exists.

According to an embodiment of the disclosure, the operating method may further comprise, in case of being identified that the at least one service exists, select one of a plurality of SIMs including the at least one SIM as a SIM for the at least one service, based on at least one of a promotion package, a radio access technology (RAT), or account information for each of the plurality of SIMs.

According to an embodiment of the disclosure, the operating method may further comprise displaying recommended SIM setting information indicating a SIM selected for each of the services.

According to an embodiment of the disclosure, the operating method may further comprise detecting that a signal indicating that the recommended SIM setting information is to be used as the SIM setting information is inputted.

According to an embodiment of the disclosure, the operating method may further comprise updating the SIM setting information to the recommended SIM setting information.

According to an embodiment of the disclosure, an operating method of an electronic device (e.g., an electronic device 101 in FIG. 1, 2, 3, 5A, 5B, or 5C) may comprise, based on a subscriber identity module (SIM) change event, in which at least one SIM is inserted, occurring, identifying whether a number of SIMs inserted into the electronic device (e.g., the electronic device 101 in FIG. 1, 2, 3, 5A, 5B, or 5C) is two or more.

According to an embodiment of the disclosure, the operating method may further comprise, in case of being identified that the number of the SIMs is two or more, identifying whether the SIMs are included in a first SIM group.

According to an embodiment of the disclosure, the operating method may further comprise, in case of being identified that the SIMs are included in the first SIM group, selecting a SIM for each of services provided by the electronic device (e.g., the electronic device 101 in FIG. 1, 2, 3, 5A, 5B, or 5C), based on a database which includes SIM setting information for the services provided by the electronic device (e.g., the electronic device 101 in FIG. 1, 2, 3, 5A, 5B, or 5C), for each of a plurality of SIM groups including the first SIM group.

According to an embodiment of the disclosure, the operating method may further comprise displaying recommended SIM setting information indicating a SIM selected for each of the services.

According to an embodiment of the disclosure, the operating method may further comprise detecting that a signal indicating that the recommended SIM setting information is to be used as the SIM setting information is inputted.

According to an embodiment of the disclosure, the operating method may further comprise updating SIM setting information for the first SIM group to the recommended SIM setting information.

According to an embodiment of the disclosure, the operating method may further comprise, in case of being identified that the number of SIMs inserted into the electronic device (e.g., the electronic device 101 in FIG. 1, 2, 3, 5A, 5B, or 5C) is one or that at least some of the two or more SIMs are not included in the first SIM group, identifying whether SIM-related information related to the at least one SIM exists in another database which is stored in the memory (e.g., the memory 130 in FIG. 1, 5A, 5B, or 5C) and includes the SIM setting information for services provided by the electronic device (e.g., the electronic device 101 in FIG. 1, 2, 3, 5A, 5B, or 5C).

According to an embodiment of the disclosure, the operating method may further comprise, in case of being identified that the SIM-related information exists in the other database, selecting a SIM for each of the services based on the SIM setting information.

According to an embodiment of the disclosure, selecting the SIM for each of the services based on the SIM setting information may comprise, based on assignment time of SIMs assigned for the services included in the SIM setting information, select one of a plurality of SIMs including the at least one SIM as a SIM for one of the services.

According to an embodiment of the disclosure, selecting the SIM for each of the services based on the SIM setting information may comprise identifying whether at least one service, for which a SIM is not selected among the services, exists.

According to an embodiment of the disclosure, selecting the SIM for each of the services based on the SIM setting information may comprise, in case of being identified that the at least one service exists, selecting one of a plurality of SIMs including the at least one SIM as a SIM for the at least one service, based on at least one of a promotion package, a radio access technology (RAT), or account information for each of the plurality of SIMs.

According to an embodiment of the disclosure, an operating method of an electronic device (e.g., an electronic device 101 in FIG. 1, 2, 3, 5A, 5B, or 5C) may comprise, based on a subscriber identity module (SIM) change event, in which at least one SIM is inserted, occurring, identifying whether an Internet connection is possible.

According to an embodiment of the disclosure, the operating method may further comprise, in case of being identified that the Internet connection is possible, synchronizing a first database which is stored in the memory (e.g., the memory 130 in FIG. 1, 5A, 5B, or 5C) and includes SIM setting information for services provided by the electronic device (e.g., the electronic device 101 in FIG. 1, 2, 3, 5A, 5B, or 5C) with a second database stored in an external electronic device (e.g., the server 108 in FIG. 1).

According to an embodiment of the disclosure, the operating method may further comprise identifying whether the SIM setting information exists in at least one active SIM among active SIMs inserted in the electronic device (e.g., the electronic device 101 in FIG. 1, 2, 3, 5A, 5B, or 5C).

According to an embodiment of the disclosure, the operating method may further comprise, in case of being identified that the SIM setting information exists in the at least one active SIM, identifying whether the SIM setting information existing in the active SIM is latest SIM setting information.

According to an embodiment of the disclosure, the operating method may further comprise, in case of being identified that the SIM setting information existing in the active SIM is the latest SIM setting information, synchronizing the first database with the latest SIM setting information.

According to an embodiment of the disclosure, the operating method may further comprise identifying whether SIM-related information related to the at least one SIM exists in the first database.

According to an embodiment of the disclosure, the operating method may further comprise, in case of being identified that the SIM-related information exists in the first database, select a SIM for each of the services based on the latest SIM setting information.

According to an embodiment of the disclosure, selecting the SIM for each of the services based on the latest SIM setting information may comprise, based on assignment time of SIMs assigned for the services included in the latest SIM setting information, selecting one of a plurality of SIMs including the at least one SIM as a SIM for one of the services.

According to an embodiment of the disclosure, selecting the SIM for each of the services based on the latest SIM setting information may comprise identifying whether at least one service, for which a SIM is not selected among the services, exists.

According to an embodiment of the disclosure, selecting the SIM for each of the services based on the latest SIM setting information may comprise, in case of being identified that the at least one service exists, selecting one of a plurality of SIMs including the at least one SIM as a SIM for the at least one service, based on at least one of a promotion package, a radio access technology (RAT), or account information for each of the plurality of SIMs.

According to an embodiment of the disclosure, it may be possible for an electronic device to adaptively provide SIM setting.

According to an embodiment of the disclosure, it may be possible for an electronic device to adaptively provide SIM setting appropriate for each service.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
   memory storing one or more computer programs; and
   at least one processor operatively connected to the memory,
   wherein the one or more computer programs include computer-executable instructions that, when executed by the at least one processor, cause the electronic device to:
   based on a subscriber identity module (SIM) change event, in which at least one SIM is newly inserted or activated while one or more SIMs are already inserted or activated, occurring, identify whether SIM-related information related to the at least one SIM newly inserted or activated exists in a database which is stored in the memory and includes SIM setting information for different types of services provided by the electronic device, and
   in case of being identified that the SIM-related information exists in the database, select one SIM, among a plurality of inserted or activated SIMs that includes the at least one SIM, for each of the different types of the services based on the SIM setting information, and
   wherein a first SIM among the plurality of inserted or activated SIMs is selected for a first type of service among the different types of the services and a second SIM among the plurality of inserted or activated SIMs is selected for a second service among the different types of the services.

2. The electronic device of claim 1, wherein the one or more computer programs further include computer-executable instructions that, when executed by the at least one processor, cause the electronic device to:
   based on assignment time of each the plurality of inserted or activated SIMs assigned for the different types of the services included in the SIM setting information, select the one among the plurality of inserted or activated SIMs including the at least one SIM for each of the different types of the services.

3. The electronic device of claim 2, wherein the one or more computer programs further include computer-executable instructions that, when executed by the at least one processor, cause the electronic device to:
based on most recent assignment time among the assignment time of each of the plurality of inserted or activated SIMs assigned for the different types of the services, select the one among the plurality of inserted or activated SIMs for each of the different types of the services.

4. The electronic device of claim 1, wherein the one or more computer programs further include computer-executable instructions that, when executed by the at least one processor, cause the electronic device to:
identify whether at least one service, for which one among the plurality of inserted or activated SIMs is not selected, exists, and
in case of being identified that the at least one service exists, select one among the plurality of inserted or activated SIMs including the at least one SIM as one among the plurality of inserted or activated SIMs for the at least one service, based on at least one of a promotion package, a radio access technology (RAT), or account information for each of the plurality of inserted or activated SIMs.

5. The electronic device of claim 4, wherein the one or more computer programs further include computer-executable instructions that, when executed by the at least one processor, cause the electronic device to:
select a SIM which corresponds to a promotion package having lowest cost for the at least one service from among promotion packages for the plurality of inserted or activated SIMs as the SIM for the at least one service,
select a SIM of a latest version from among versions of RATs for the plurality of inserted or activated SIMs as the SIM for the at least one service, or
select a SIM which corresponds to account information having largest account balance from among account information for the plurality of inserted or activated SIMs as the SIM for the at least one service.

6. The electronic device of claim 1, further comprising:
a display module,
wherein the one or more computer programs further include computer-executable instructions that, when executed by the at least one processor, cause the electronic device to:
display, via the display module, recommended SIM setting information indicating the one among the plurality of inserted or activated SIMs selected for each of the different types of the services.

7. The electronic device of claim 6, further comprising:
an input module,
wherein the one or more computer programs further include computer-executable instructions that, when executed by the at least one processor, cause the electronic device to:
detect, via the input module, that a signal indicating that the recommended SIM setting information is to be used as the SIM setting information is inputted, and
update the SIM setting information based on the recommended SIM setting information.

8. The electronic device of claim 1, wherein the one or more computer programs further include computer-executable instructions that, when executed by the at least one processor, cause the electronic device to:
in case of being identified that the SIM-related information does not exist in the database, identify whether at least one service, for which one among the plurality of inserted or activated SIMs is not selected, exists, and
in case of being identified that the at least one service exists, select one among the plurality of inserted or activated SIMs including the at least one SIM for the at least one service, based on at least one of a promotion package, a radio access technology (RAT), or account information for each of the plurality of inserted or activated SIMs.

9. The electronic device of claim 8, further comprising:
a display module,
wherein the one or more computer programs further include computer-executable instructions that, when executed by the at least one processor, cause the electronic device to:
display, via the display module, recommended SIM setting information indicating the one among the plurality of inserted or activated SIMs selected for each of the different types of the services.

10. The electronic device of claim 9, further comprising:
an input module,
wherein the one or more computer programs further include computer-executable instructions that, when executed by the at least one processor, cause the electronic device to:
detect, via the input module, that a signal indicating that the recommended SIM setting information is to be used as the SIM setting information is inputted, and
update the SIM setting information to the recommended SIM setting information.

11. An electronic device comprising:
memory storing one or more computer programs; and
at least one processor operatively connected to the memory,
wherein the one or more computer programs include computer-executable instructions that, when executed by the at least one processor, cause the electronic device to:
based on a subscriber identity module (SIM) change event, in which at least one SIM is newly inserted or activated, occurring, identify whether there is a plurality of inserted or activated SIMs,
in case of being identified that there is the plurality of inserted or activated SIMs, identify whether the plurality of inserted or activated SIMs are included in a first SIM group, and
in case of being identified that the plurality of inserted or activated SIMs are included in the first SIM group, select one among the plurality of inserted or activated SIMs for each of different types of services provided by the electronic device, based on a database, which is stored in the memory and includes SIM setting information for the different types of the services provided by the electronic device, for each of a plurality of SIM groups including the first SIM group, and
wherein a first SIM among the plurality of inserted or activated SIMs is selected for a first type of service among the different types of the services and a second SIM among the plurality of inserted or activated SIMs is selected for a second service among the different types of the services.

12. The electronic device of claim 11, further comprising:
a display module,
wherein the one or more computer programs further include computer-executable instructions that, when executed by the at least one processor, cause the electronic device to:
   display, via the display module, recommended SIM setting information indicating one among the plurality of inserted or activated SIMs selected for each of the different types of the services.

13. The electronic device of claim 12, further comprising:
an input module,
wherein the one or more computer programs further include computer-executable instructions that, when executed by the at least one processor, cause the electronic device to:
   detect, via the input module, that a signal indicating that the recommended SIM setting information is to be used as the SIM setting information is inputted, and
   update SIM setting information for the first SIM group based on the recommended SIM setting information.

14. The electronic device of claim 11, wherein the one or more computer programs further include computer-executable instructions that, when executed by the at least one processor, cause the electronic device to:
   in case of being identified that at least some of the plurality of inserted or activated SIMs are not included in the first SIM group, identify whether SIM-related information related to the at least one SIM exists in another database which is stored in the memory and includes the SIM setting information for the different types of the services provided by the electronic device, and
   in case of being identified that the SIM-related information exists in the other database, select the one among the plurality of inserted or activated SIMs for each of the different types of the services based on the SIM setting information.

15. The electronic device of claim 14, wherein the one or more computer programs further include computer-executable instructions that, when executed by the at least one processor, cause the electronic device to:
   based on assignment time of each of the plurality of inserted or activated SIMs assigned for the different types of the services included in the SIM setting information, select the one among the plurality of inserted or activated SIMs including the at least one SIM for at least one of the different types of the services.

16. The electronic device of claim 14, wherein the one or more computer programs further include computer-executable instructions that, when executed by the at least one processor, cause the electronic device to:
   identify whether at least one service, for which one among the plurality of inserted or activated SIMs is not selected, exists, and
   in case of being identified that the at least one service exists, select one among the plurality of inserted or activated SIMs including the at least one SIM as one among the plurality of inserted or activated SIMs for the at least one service, based on at least one of a promotion package, a radio access technology (RAT), or account information for each of the plurality of inserted or activated SIMs.

17. An electronic device comprising:
memory storing one or more computer programs; and
at least one processor operatively connected to the memory,
wherein the one or more computer programs include computer-executable instructions that, when executed by the at least one processor, cause the electronic device to:
   based on a subscriber identity module (SIM) change event, in which at least one SIM is inserted, occurring, identify whether an Internet connection is possible,
   in case of being identified that the Internet connection is possible, synchronize a first database which is stored in the memory and includes SIM setting information for services provided by the electronic device with a second database stored in an external electronic device,
   identify whether the SIM setting information exists in at least one active SIM among active SIMs inserted in the electronic device,
   in case of being identified that the SIM setting information exists in the at least one active SIM, identify whether the SIM setting information existing in the active SIM is latest SIM setting information, and
   in case of being identified that the SIM setting information existing in the active SIM is the latest SIM setting information, synchronize the first database with the latest SIM setting information.

18. The electronic device of claim 17, wherein the one or more computer programs further include computer-executable instructions that, when executed by the at least one processor, cause the electronic device to:
   identify whether SIM-related information related to the at least one SIM exists in the first database, and
   in case of being identified that the SIM-related information exists in the first database, select a SIM for each of the services based on the latest SIM setting information.

19. The electronic device of claim 18, wherein the one or more computer programs further include computer-executable instructions that, when executed by the at least one processor, cause the electronic device to:
   based on assignment time of SIMs assigned for the services included in the latest SIM setting information, select one of a plurality of SIMs including the at least one SIM as a SIM for one of the services.

20. The electronic device of claim 18, wherein the one or more computer programs further include computer-executable instructions that, when executed by the at least one processor, cause the electronic device to:
   identify whether at least one service, for which a SIM is not selected among the services, exists, and
   in case of being identified that the at least one service exists, select one of a plurality of SIMs including the at least one SIM as a SIM for the at least one service, based on at least one of a promotion package, a radio access technology (RAT), or account information for each of the plurality of SIMs.

* * * * *